United States Patent
Onishi

(10) Patent No.: US 11,201,975 B2
(45) Date of Patent: Dec. 14, 2021

(54) SERVER SYSTEM HAVING VOICE-CONTROLLED PRINTING APPARATUS

(71) Applicant: CANON KABUSHIKI KAISHA, Tokyo (JP)

(72) Inventor: Kohei Onishi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/779,823

(22) Filed: Feb. 3, 2020

(65) Prior Publication Data
US 2020/0259967 A1 Aug. 13, 2020

(30) Foreign Application Priority Data

Feb. 7, 2019 (JP) .............................. JP2019-020847

(51) Int. Cl.
*H04N 1/00* (2006.01)
*G06F 3/12* (2006.01)

(52) U.S. Cl.
CPC ......... *H04N 1/00403* (2013.01); *G06F 3/121* (2013.01); *G06F 3/1273* (2013.01); *H04N 1/00477* (2013.01); *H04N 2201/0094* (2013.01)

(58) Field of Classification Search
CPC ........... H04N 1/00403; H04N 1/00477; G06F 3/121; G06F 3/1234
See application file for complete search history.

(56) References Cited

U.S. PATENT DOCUMENTS

| 2010/0238479 | A1* | 9/2010 | Yamazaki | G06F 3/121 |
| | | | | 358/1.14 |
| 2018/0285033 | A1* | 10/2018 | Suzuki | H04N 1/6044 |
| 2019/0306327 | A1* | 10/2019 | Matysiak | G06F 3/121 |
| 2020/0106896 | A1* | 4/2020 | Kondoh | G06F 3/167 |
| 2020/0177746 | A1* | 6/2020 | Katsumata | G10L 15/26 |
| 2020/0177747 | A1* | 6/2020 | Yasuda | H04N 1/00395 |
| 2020/0195791 | A1* | 6/2020 | Takahashi | H04N 1/0097 |

FOREIGN PATENT DOCUMENTS

JP 2003-131773 A 5/2003

* cited by examiner

*Primary Examiner* — Benjamin O Dulaney
(74) *Attorney, Agent, or Firm* — Venable LLP

(57) ABSTRACT

A notification system includes a printing apparatus and a server system that controls a voice control device and the printing apparatus. Information for notifying a user of information concerning specified trouble by voice is information for confirming, with the user, by voice, whether the specified trouble has occurred in the printing apparatus. If a response of the user to the information for confirming, with the user, by voice, whether the specified trouble has occurred in the printing apparatus indicates that the specified trouble has occurred in the printing apparatus, the printing apparatus is instructed to execute the processing for solving the specified trouble, and if the response of the user to the information for confirming, with the user, by voice, whether the specified trouble has occurred in the printing apparatus indicates that the specified trouble has not occurred in the printing apparatus, the printing apparatus is not instructed to execute the processing for solving the specified trouble. In addition, information for confirming, with the user, by voice, whether a trouble different from the specified trouble has occurred in the printing apparatus is transmitted.

19 Claims, 17 Drawing Sheets

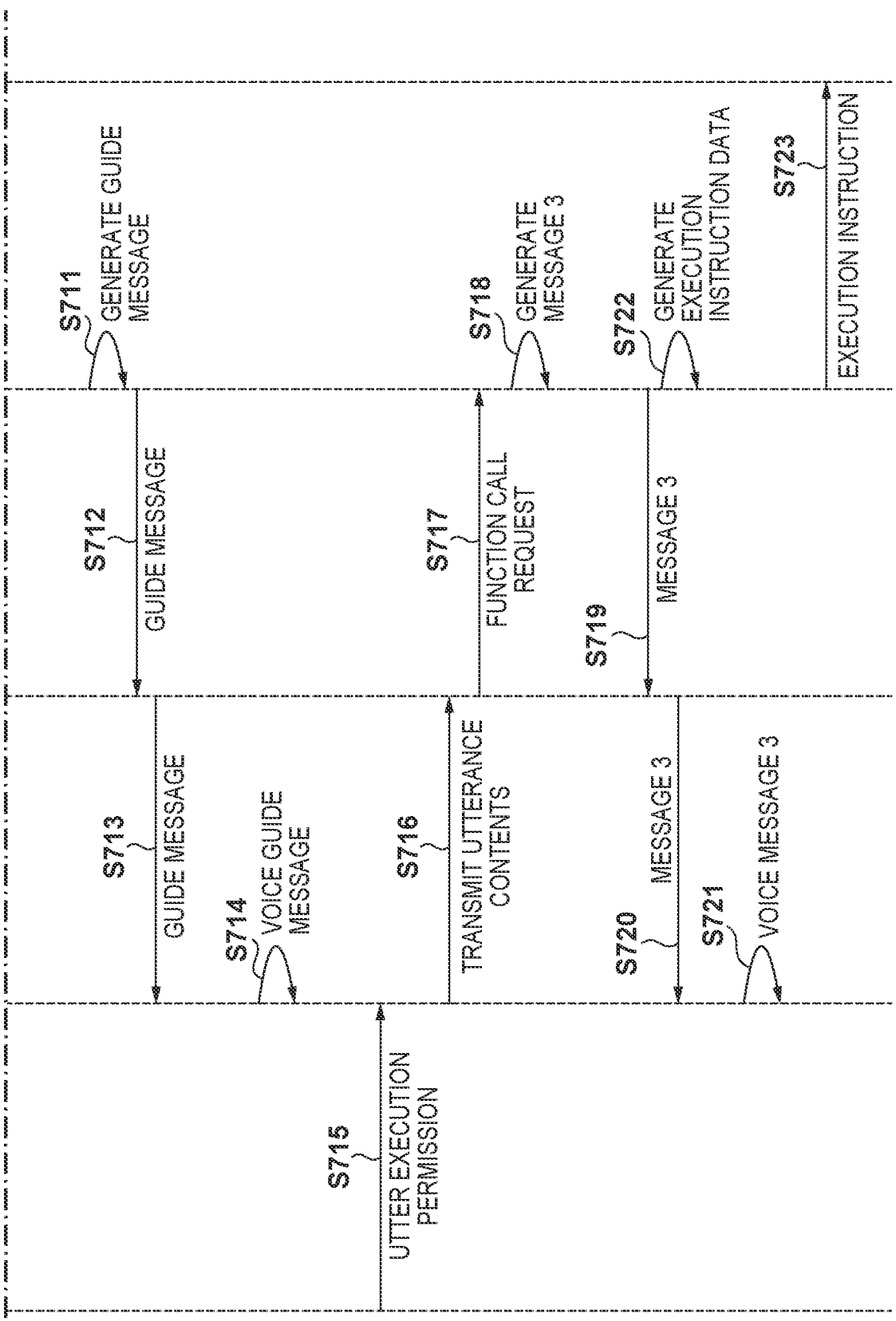

FIG. 9

| PRINT TARGET 901 | ADDITIONAL SETTING ITEM 902 | SETTABLE VALUE 903 |
|---|---|---|
| PUZZLE | DIFFICULTY | SIMPLE, COMMON, DIFFICULT RANDOM |
| COLORING PICTURE | TARGET PERSON | FOR ADULTS, FOR CHILDREN |
| WRITING PAPER | — | — |
| STAFF NOTATION | — | — |
| CHECK LIST | — | — |

FIG. 10

| FUNCTION LIST | ADDITIONAL SETTING ITEM | SETTABLE VALUE |
|---|---|---|
| PRINTING | NUMBER OF SHEETS | 1~99 |
| CONFIRMING STATE | NUMBER OF SHEETS | 1~99 |
| COPYING | NUMBER OF SHEETS | 1~99 |
| CHANGING SETTINGS | — | — |
| PERFORMING TROUBLE SHOOTING | — | — |
| TURNING ON/OFF POWER | — | — |

| TROUBLE OCCURRING IN MFP 1101 | UTTERANCE TEMPLATE 1102 | VARIABLE VALUE 1 1103 | | VARIABLE VALUE 2 1104 |
|---|---|---|---|---|
| COLOR TROUBLE | {1} IS {2} | COLOR | | WON'T COME OUT |
| | | INK | | BLURRED |
| | | RED | | LIGHT |
| | | RED INK | | STRANGE |
| NOISE TROUBLE | {1} NOISY | SOUND IS | | — |
| | BE QUIET | MACHINE SOUND IS | | — |
| PAPER JAM TROUBLE | {1} IS {2} | PAPER | | JAMMED |
| | | SHEET | | WON'T COME OUT |

FIG. 12

| TROUBLE OCCURRING IN MFP 1201 | PRIORITY VALUE 1202 | STATUS CONTENT 1203 | GUIDE MESSAGE 1204 |
|---|---|---|---|
| COLOR TROUBLE | 100 | INK NO-ATTACHED | CANNOT CONFIRM INK TANK. CHECK INK TANK |
| | 90 | IMPOSSIBLE TO ACQUIRE INK STATUS | CANNOT ACQUIRE INK STATE. CONFIRM INK TANK |
| | 75 | INK LOW STATUS | REPLACE INK |
| | 20 | CLOSE TO EXECUTION TIME OF HEAD CLEANING | ARE YOU SURE YOU WANT TO EXECUTE STRONG HEAD CLEANING? |
| | 0 | FAR FROM EXECUTION TIME OF HEAD CLEANING | ARE YOU SURE YOU WANT TO EXECUTE NORMAL HEAD CLEANING? |
| PAPER JAM TROUBLE | 100 | TWO OR MORE RESOLUTION PROCESSES FOR PAPER JAM TROUBLE WHOSE EXECUTION TIME IS CLOSE | DETACH BACK COVER OF MAIN BODY AND REMOVE SHEET |
| | 50 | ONE RESOLUTION PROCESS FOR PAPER JAM TROUBLE WHOSE EXECUTION TIME IS CLOSE | OPEN COVER OF MAIN BODY AND REMOVE SHEET |
| | 0 | FAR FROM EXECUTION TIME OF RESOLUTION PROCESSING OF PAPER JAM TROUBLE | REMOVE SHEET GRADUALLY FROM DISCHARGE PORT OF MAIN BODY |

F I G. 13

| FUNCTION CALL REQUEST | PRIORITY VALUE | MESSAGE 4 |
|---|---|---|
| CLOUD PRINT TROUBLE | 70 | CAN'T CLOUD PRINT BE EXECUTED SUCCESSFULLY? |
| COLOR TROUBLE | 50 | IS COLOR OF PRINTED MATERIAL MISSING? |
| PAPER JAM TROUBLE | 40 | IS SHEET JAMMED? |
| NOISE TROUBLE | 10 | IS SOUND OF PRINTER NOISY? |

1301    1302    1303

SERVER SYSTEM HAVING
VOICE-CONTROLLED PRINTING
APPARATUS

BACKGROUND OF THE INVENTION

Field of the Invention

The present invention relates to a server system and a control method.

Description of the Related Art

There is known a technique of operating a printing apparatus from a voice control device communicably connected to the printing apparatus. Japanese Patent Laid-Open No. 2003-131773 describes a technique of classifying all operation items by functions and creating a hierarchical menu formed from setting items. Japanese Patent Laid-Open No. 2003-131773 describes a technique of guiding a user to operate the apparatus only by voice input by searching the hierarchical menu by a keyword input from the voice control device, presenting a list of setting items to the user, and selecting the setting item selected from the list by the user.

In Japanese Patent Laid-Open No. 2003-131773, however, if the user has poor understanding of the hierarchical menu when operating the apparatus only by voice input, it is difficult to operate the printing apparatus only by voice input. In addition, it is difficult for the user lacking understanding of the printing apparatus to perform a keyword search for setting items appropriately.

SUMMARY OF THE INVENTION

The present invention provides a server system for improving the convenience of a printing apparatus, and a control method.

The present invention in one aspect provides a control method for a server system that controls a voice control device and a printing apparatus, comprising: acquiring state information concerning a state of the printing apparatus from the printing apparatus based on a fact that a user inputs a predetermined voice to the voice control device; specifying a trouble occurring in the printing apparatus based on the state information acquired from the printing apparatus; transmitting, to the voice control device, information for notifying the user of information concerning the specified trouble by voice; and instructing the printing apparatus to execute processing for solving the specified trouble.

According to the present invention, it is possible to improve the convenience of a printing apparatus.

Further features of the present invention will become apparent from the following description of exemplary embodiments with reference to the attached drawings.

BRIEF DESCRIPTION OF THE DRAWINGS

FIGS. 7A and 7B are sequence charts showing processing until the MFP executes troubleshooting;
FIG. 9 is a table showing a printed material list;
FIG. 10 is a table showing a function list;
FIG. 11 is a table for specifying a trouble;
FIG. 12 is a table for specifying troubleshooting;
FIG. 13 is a table for specifying a trouble.

DESCRIPTION OF THE EMBODIMENTS

Figure 1:
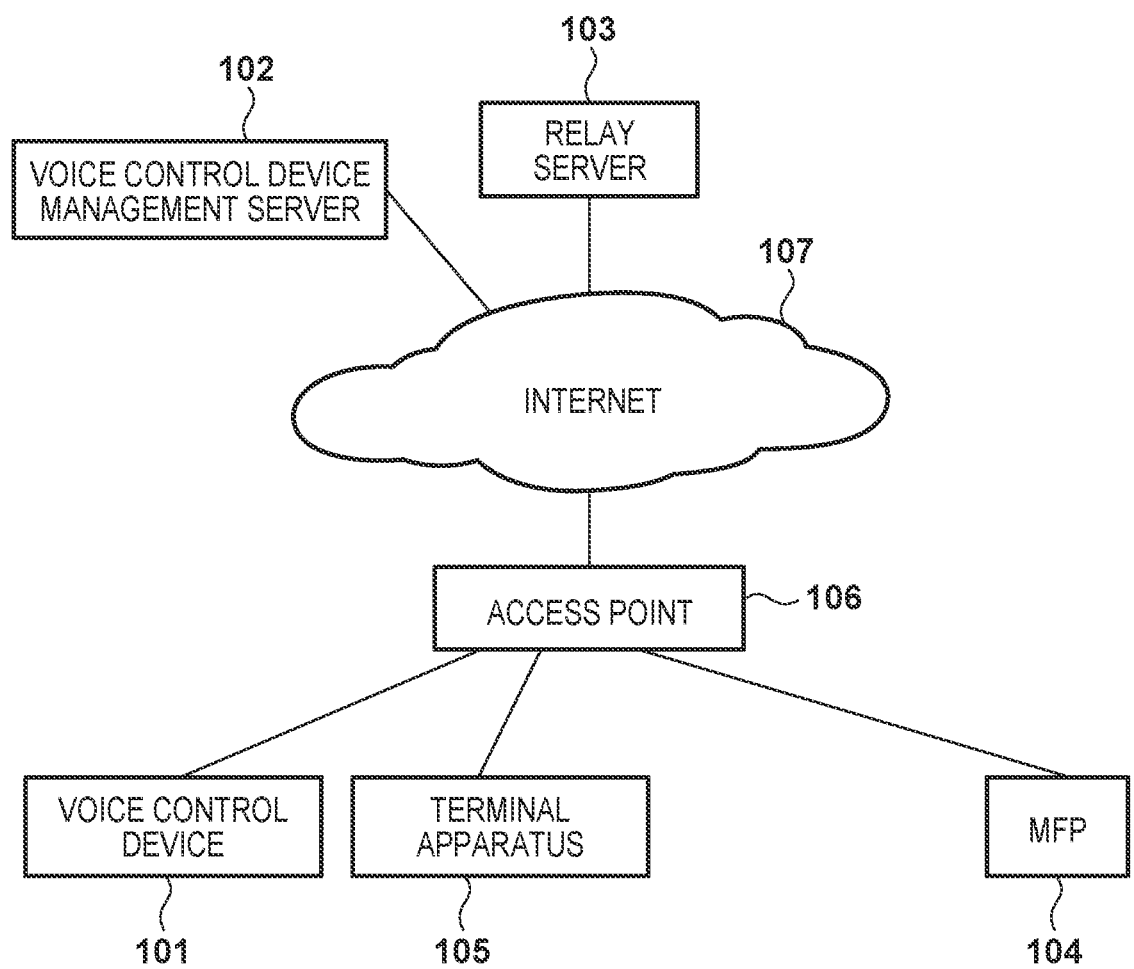
FIG. 1 is a view showing the configuration of a printing system.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

First Embodiment

A printing apparatus and a voice control device according to this embodiment will be described. This embodiment exemplifies, as the printing apparatus, a multifunction printer (to be referred to as an MFP hereinafter) that can provide a copy service, a FAX service, and a print service and executes printing by an inkjet method. The present invention, however, is not limited to this. As the printing apparatus, for example, a single function printer (to be referred to as an SFP hereinafter) having a single function is also applicable. As a printing method used by the printing apparatus, an electrophotographic method or a thermal sublimation method may be adopted. This embodiment exemplifies a smart speaker (AI speaker) as the voice control device. Note that the smart speaker is a device for instructing a device existing in the same network to perform processing in accordance with a voice uttered by the user or notifying the user of information acquired via the network in accordance with a voice uttered by the user.

FIG. 1 is a view showing an example of the configuration of a printing system according to this embodiment. The printing system shown in FIG. 1 includes a voice control device 101, a voice control device management server 102, a relay server 103, an MFP 104, a terminal apparatus 105, and an access point (AP) 106. The MFP 104 is an example of a printing apparatus having a printing function, and will be explained as an MFP in this embodiment, as described above. The terminal apparatus 105 is an arbitrary terminal apparatus such as a smartphone, a PC (Personal Computer), a tablet terminal, a mobile phone, or a PDA (Personal Digital Assistant). Note that the terminal apparatus 105 is a smartphone in the following description. The access point (AP)

106 is, for example, a wireless LAN router, and an apparatus connected to the AP 106 can use the Internet via the AP 106. Furthermore, in this embodiment, the voice control device 101, the MFP 104, and the terminal apparatus 105 are wirelessly connected to the AP 106 in accordance with the wireless communication method of a wireless LAN complying with the IEEE 802.11 standard series. That is, the voice control device 101, the MFP 104, and the terminal apparatus 105 are connected to a local network formed by the AP 106.

In the printing system, the user can instruct printing by voice. In this embodiment, the voice control device 101 is a smart speaker, as described above. More specifically, the voice control device 101 can perform voice recognition of a voice of the user input to a microphone, and transmit the voice data via the network formed by the AP 106 and the Internet 107, and can also output, by the loudspeaker, voice data received via the Internet 107 and the network formed by the AP 106. The voice control device 101 and the terminal apparatus 105 can communicate with the voice control device management server 102 via the AP 106 and the Internet 107. The voice control device management server 102 manages the voice control device 101, and associates, for example, the voice control device 101 and the MFP 104 with each other. In addition, for example, the voice control device management server 102 performs predetermined processing (to be described later) in accordance with contents of the voice data received from the voice control device 101.

The voice control device management server 102 and the relay server 103 are interconnected via the Internet 107. The relay server 103 controls the MFP 104 to, for example, generate print data in accordance with a request from the voice control device management server 102 and transmit the print data to the MFP 104. Furthermore, the relay server 103 and the MFP 104 are interconnected via the network formed by the AP 106 and the Internet 107, and the relay server 103 instructs, via the Internet 107 and the network formed by the AP 106, the MFP 104 to execute printing. Note that in the system shown in FIG. 1, the voice control device 101, the MFP 104, and the terminal apparatus 105 are connected to the same AP to be able to use the Internet 107. The present invention, however, is not limited to this. For example, the voice control device 101, the MFP 104, and the terminal apparatus 105 may be connected to different APs to be able to use the Internet. Alternatively, these apparatuses may be able to use the Internet by a mobile communication network such as LTE or 4G without using any AP.

Figure 2:
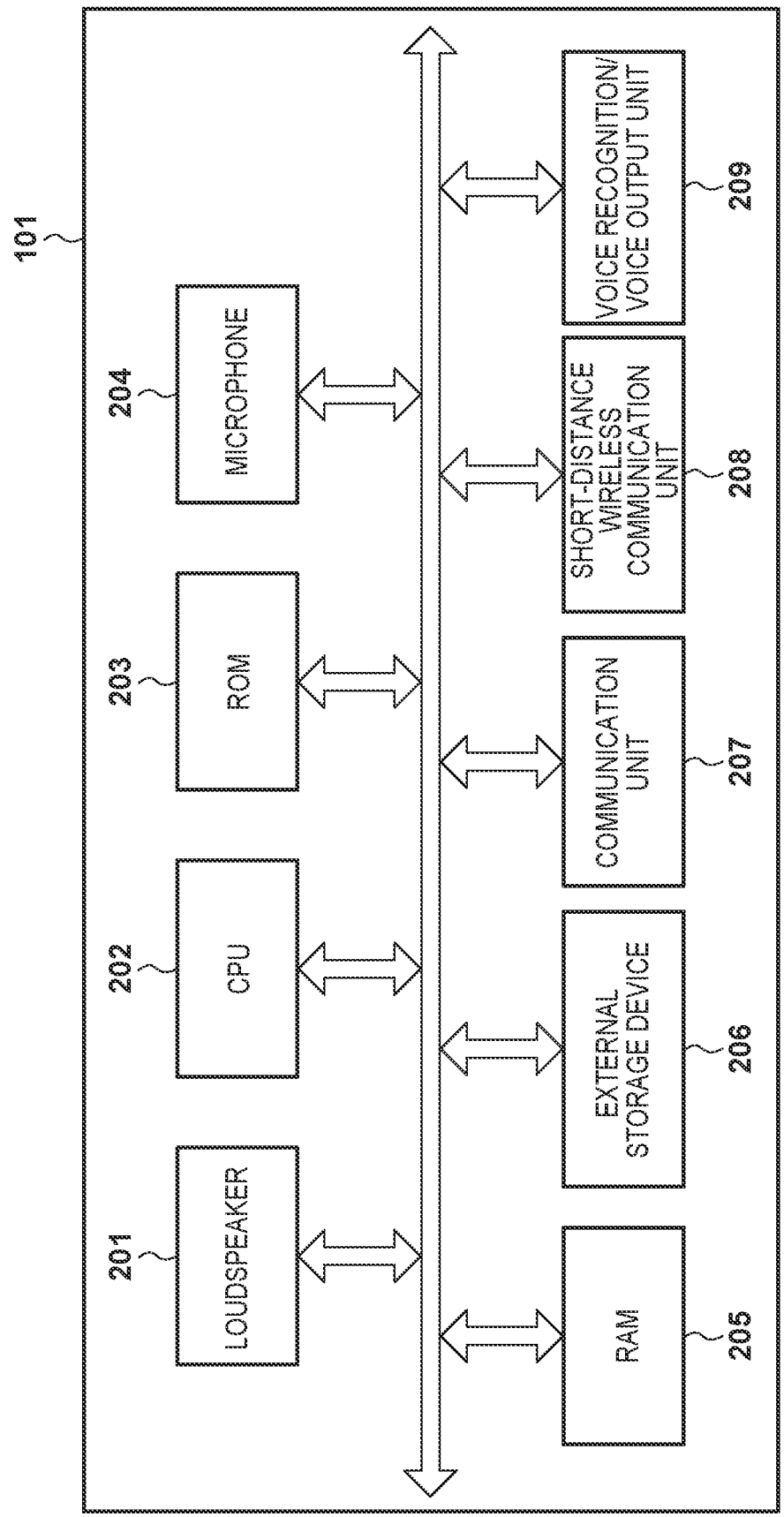
FIG. 2 is a block diagram showing the block arrangement of a voice control device.

FIG. 2 is a block diagram showing the hardware block arrangement of the voice control device 101. The voice control device 101 includes a loudspeaker 201, a CPU 202, a ROM 203, a microphone 204, a RAM 205, an external storage device 206, a communication unit 207, a short-distance wireless communication unit 208, and a voice recognition/voice output unit 209. Note that respective blocks shown in FIG. 2 are interconnected using, for example, an internal bus. Note also that CPU is an acronym for Central Processing Unit, ROM is an acronym for Read Only Memory, and RAM is an acronym for Random Access Memory. The CPU 202, the ROM 203, the RAM 205, and the like form the computer of the voice control device 101. In this embodiment, the operation of the voice control device 101 is implemented when, for example, the CPU 202 loads a program stored in the ROM 203 into the RAM 205, and executes it.

The loudspeaker 201 outputs a voice based on voice data. The CPU 202 is provided on, for example, a system control board, and comprehensively controls the voice control device 101. The ROM 203 stores fixed data such as control programs to be executed by the CPU 202, data tables, and an embedded OS (Operating System) program. In this embodiment, each control program stored in the ROM 203 is a target of software execution control of the embedded OS stored in the ROM 203. Software execution control is, for example, scheduling, task switch, or interrupt processing. The microphone 204 receives a voice on the periphery of the voice control device 101, for example, a voice uttered by the user.

The RAM 205 is formed by, for example, an SRAM (Static RAM) or the like that needs a backup power supply. Note that the RAM 205 holds data by a primary battery (not shown) for data backup and can therefore hold data such as a program control variable without volatilizing it. In addition, a memory area to store the setting information and management data of the voice control device 101 is also provided in the RAM 205. The RAM 205 is also used as the main memory and the work memory of the CPU 202. The external storage device 206 stores application software.

The communication unit 207 includes a circuit and an antenna for performing communication in accordance with a predetermined wireless communication method. For example, the communication unit 207 can wirelessly be connected to the external access point 106. In addition, the communication unit 207 can temporarily operate as an access point. That is, the communication unit 207 may have an access point function. The wireless communication used in this embodiment may have a capability of operating in accordance with the wireless communication method of a wireless LAN complying with the IEEE 802.11 standard series or may have a capability of operating in accordance with another wireless communication method. The short-distance wireless communication unit 208 executes short-distance wireless communication with another apparatus existing within a predetermined short-distance range from the voice control device 101. Note that the short-distance wireless communication unit 208 performs communication using a wireless communication method different from that of the communication unit 207. In this embodiment, the short-distance wireless communication unit 208 operates in accordance with the Bluetooth® standard.

The voice recognition/voice output unit 209 performs voice recognition of a voice input via the microphone 204 to generate voice data, and also converts externally received voice data or message data held in advance into a voice signal to output a voice from the loudspeaker 201.

Figure 3:
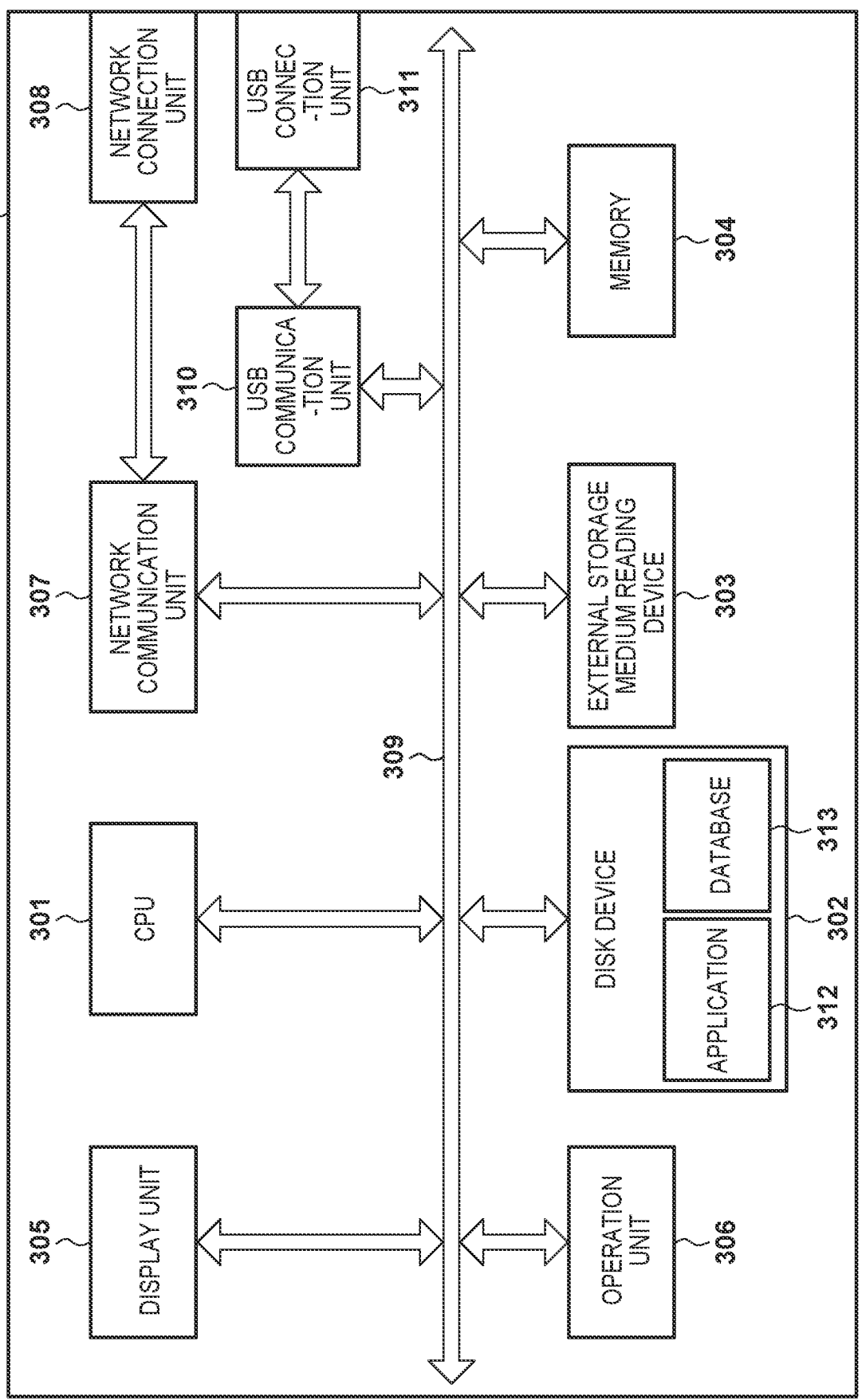
FIG. 3 is a block diagram showing the block arrangement of each of a voice control device management server and a relay server.

FIG. 3 is a block diagram showing the block arrangement of each of the voice control device management server 102 and the relay server 103. FIG. 3 shows the arrangement common to the above two apparatuses, and thus the voice control device management server 102 will be described below. Note that in this embodiment, each of the voice control device management server 102 and the relay server 103 is formed by one server (information processing apparatus). However, when a plurality of servers operate in cooperation with each other, a server system corresponding to the voice control device management server 102 or the relay server 103 may be formed.

A CPU 301 is a central processing unit for comprehensively controlling the voice control device management server 102. A disk device 302 stores an application program 312, a database 313, and an OS, as well as various files and data. An external storage medium reading device 303 is a device for reading information such as a file stored in an external storage medium such as an SD card. A memory 304 is formed by a RAM or the like, and the CPU 301 temporarily stores or buffers data in the memory 304, as needed. The CPU 301, the disk device 302, the memory 304, and the like form the computer of the voice control device management server 102 or the relay server 103.

A display unit 305 is formed by, for example, an LCD, and displays various kinds of information. Furthermore, an operation unit 306 includes a keyboard and a mouse used by the user to perform various input operations, and can accept instructions and operations from the user. A network communication unit 307 is connected to a network such as the Internet via a network connection unit 308 to perform various communications. The network connection unit 308 supports a network medium such as a wired LAN or a wireless LAN. For the wired LAN, the network connection unit 308 is, for example, a connector for connecting a wired LAN cable. For the wireless LAN, the network connection unit 308 is, for example, an antenna. Note that the network connection unit 308 may support both the wired LAN and the wireless LAN. A USB communication unit 310 is connected to various peripheral devices via a USB connection unit 311 to perform various communications.

Respective blocks shown in FIG. 3 are interconnected via a bus 309. In this embodiment, the operation of the voice control device management server 102 (or the relay server 103) is implemented when, for example, the CPU 301 loads a program necessary for processing from the disk device 302 into the memory 304 and executes the program. The voice recognition function of the voice recognition/voice output unit 209 shown in FIG. 2 may be included in the arrangement of FIG. 3. In this case, the apparatus including the arrangement of FIG. 3 can, for example, perform voice recognition of a voice signal transmitted from the voice control device 101, recognize a predetermined word, and extract it. Although this embodiment describes the voice control device management server 102 and the relay server 103 as separate servers (information processing apparatuses), these servers may be formed by a server that integrates both the server functions.

Figure 4:
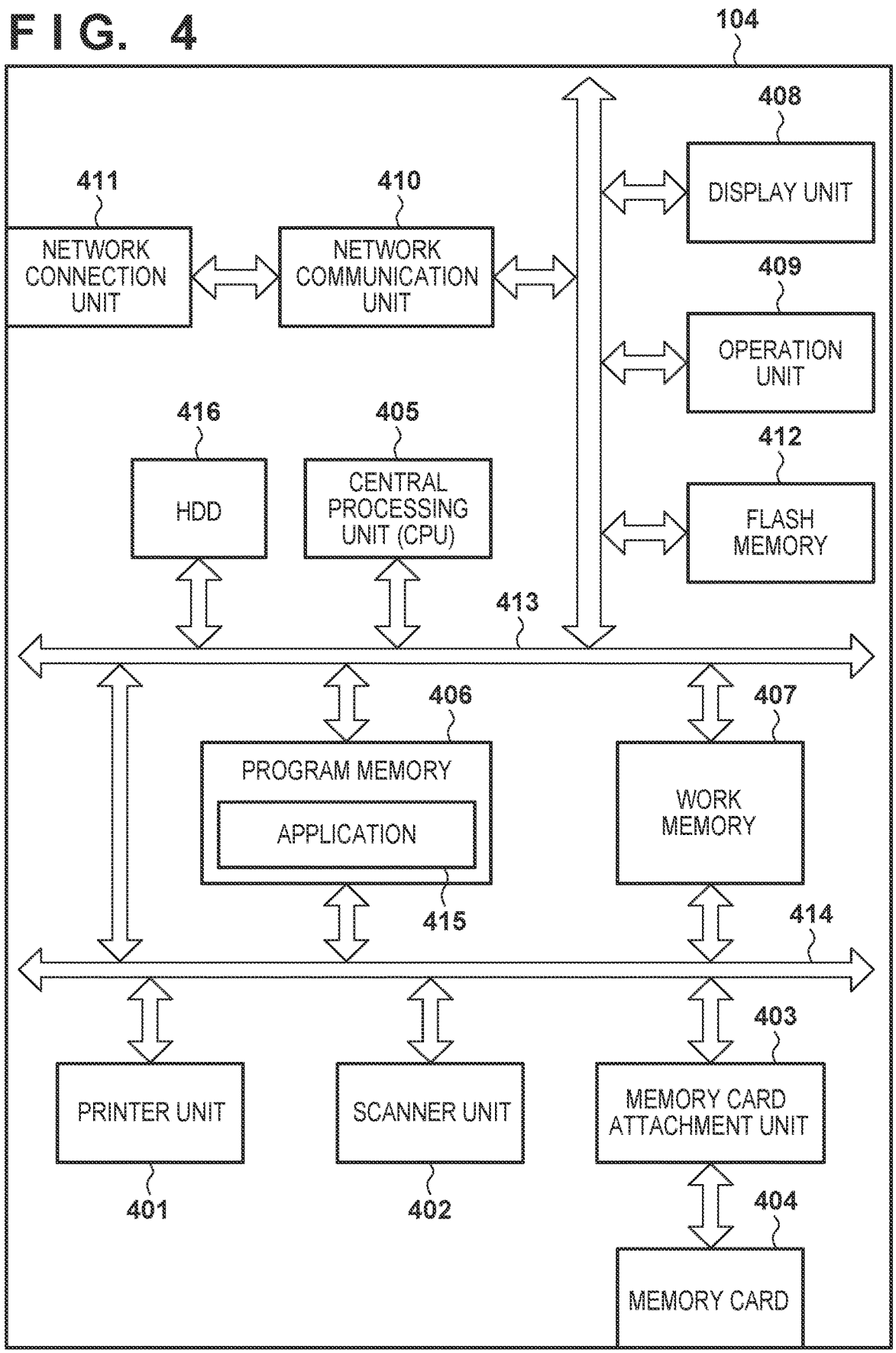
FIG. 4 is a block diagram showing the block arrangement of an MFP.

FIG. 4 is a block diagram showing the block arrangement of the MFP 104. Note that this embodiment will explain a multifunction printer as an example of the MFP 104. Instead of the form of the multifunction printer, an apparatus of another form may be used as long as the apparatus has the printing function. For example, an image processing apparatus, a copy machine, a facsimile, a printing apparatus having a single function, or the like may be used. In the MFP 104, the printing function is implemented by a printer unit 401, a scanner function is implemented by a scanner unit 402, and a storage function is implemented by a memory card attachment unit 403 and a memory card 404. The above-described units are interconnected by a bus 414.

The printer unit (printing unit) 401 prints externally received image data, image data stored in the memory card 404, or the like on a print medium such as a print sheet by a printing method such as an inkjet printing method or an electrophotographic method. In addition, the printer unit 401 manages information concerning consumable members, for example, ink information including the remaining amount of ink, and sheet information concerning the number of stacked sheets and the like.

The scanner unit 402 optically reads an original set on an original table (not shown), converts it into electronic data, and transmits image data converted into a designated file format to an external apparatus via a network or stores the image data in the memory area of an HDD 416 or the like. A copy service is implemented when image data generated by reading, by the scanner unit 402, an original placed on the original table is transferred to the printer unit 401, and the printer unit 401 executes printing on a print medium such as a print sheet based on the image data.

The memory card 404 attached to the memory card attachment unit 403 stores various file data. The file data may be read out from an external apparatus via the network and edited. Furthermore, the file data may be stored from an external apparatus in the memory card 404.

In addition, the MFP 104 includes a CPU 405, a program memory 406, a work memory 407, a display unit 408, an operation unit 409, a network communication unit 410, a network connection unit 411, and a flash memory 412. The CPU 405 is a central processing unit for comprehensively controlling the respective units in the MFP 104. The program memory 406 is formed by a ROM or the like, and stores various program codes and an application 415 for communicating with an external server. The application 415 can access the printer unit 401 to acquire consumable information concerning ink, a sheet, and the like. The work memory 407 is formed by a RAM or the like, and temporarily stores or buffers image data and the like at the time of execution of each service. The CPU 405, the program memory 406, the work memory 407, and the like form the computer of the MFP 104. The display unit 408 is formed by, for example, an LCD, and displays various kinds of information such as a user interface screen. Furthermore, the operation unit 409 includes a keyboard, a mouse, and a switch, and can accept instructions and operations from the user. The network communication unit 410 connects the MFP 104 to a network via the network connection unit 411 to perform various communications.

If the network communication unit 410 supports the wired LAN, the network connection unit 411 is a connector for connecting a wired LAN cable. If the network communication unit 410 supports the wireless LAN, the network connection unit 411 serves as an antenna. Note that the network connection unit 411 may support both the wired LAN and the wireless LAN. In this embodiment, the network communication unit 410 and the network connection unit 411 support the wireless LAN, and are connected to the AP 106 in accordance with the wireless communication method of the wireless LAN complying with the IEEE 802.11 standard series. Note that the network connection unit 411 can temporarily operate as an access point. That is, the network connection unit 411 may have the access point function. The MFP 104 may include a short-distance wireless communication unit (not shown), similar to the voice control device 101.

The flash memory 412 is a nonvolatile memory for storing image data received by the network communication unit 410 and the like. The above-described units are interconnected by a bus 413. There may be a block that performs data conversion between the buses 414 and 413. In this embodiment, the operation of the MFP 104 is implemented when, for example, the CPU 405 reads out a program necessary for processing from the program memory 406 into the work memory 407, and executes the program.

Figure 15:
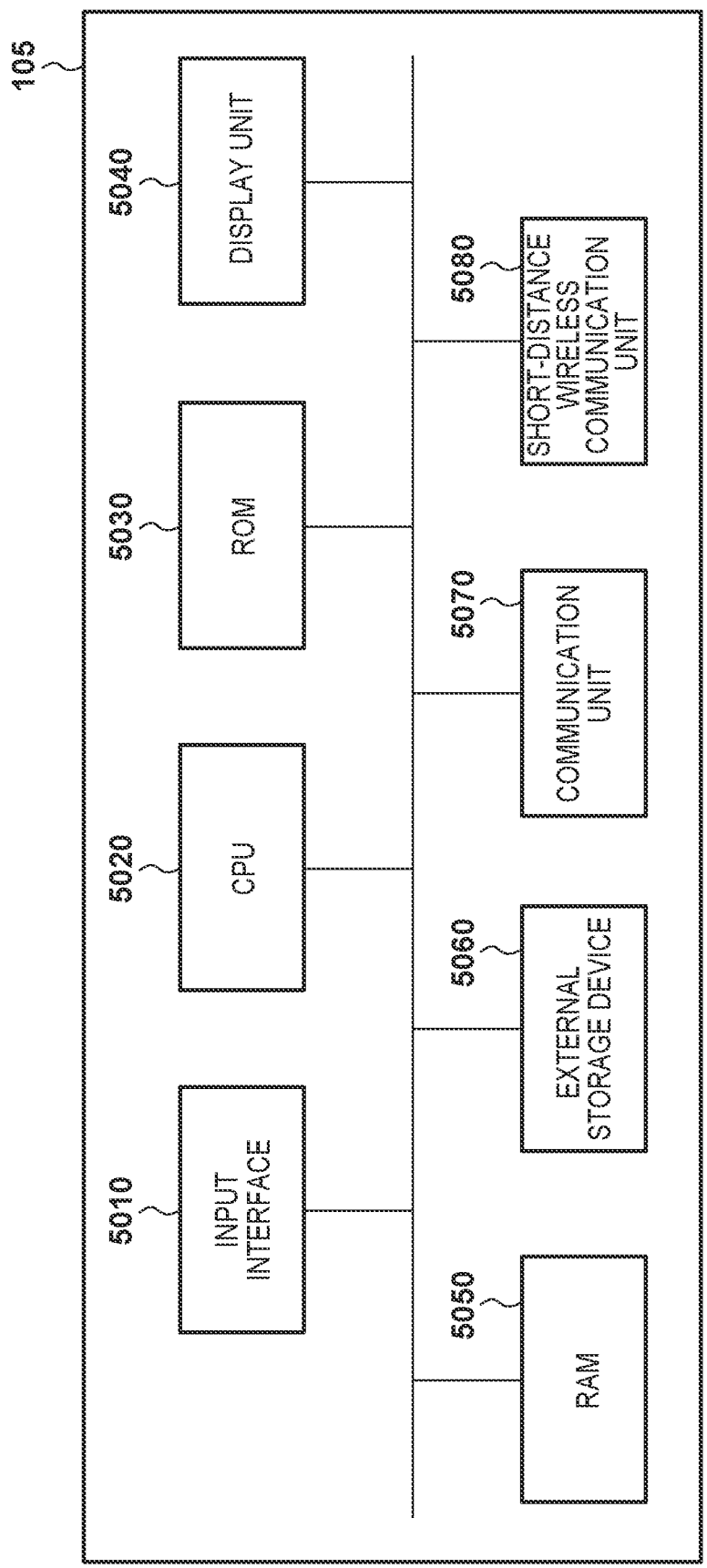
FIG. 15 is a block diagram showing the block arrangement of a terminal apparatus.

FIG. 15 is a block diagram schematically showing the hardware arrangement of the terminal apparatus 105. As an example, the terminal apparatus 105 includes an input interface 5010, a CPU 5020, a ROM 5030, a display unit 5040, a RAM 5050, an external storage device 5060, a communication unit 5070, and a short-distance wireless communication unit 5080. Note that these blocks are interconnected using, for example, an interval bus.

The CPU 5020 is a system control unit, and controls the overall apparatus. The RAM 5050 is formed by a DRAM (Dynamic RAM) or the like which needs a backup power supply, similar to, for example, the RAM 205. The RAM 5050 is also used as the main memory and the work memory of the CPU 5020. The ROM 5030 stores fixed data such as control programs to be executed by the CPU 5020, data tables, and an OS program. Note that in this embodiment, an application program (to be referred to as a voice control application hereinafter) for the voice control device 101 is installed in the terminal apparatus 105, and stored in the ROM 5030. The CPU 5020, the ROM 5030, the RAM 5050, and the like form the computer of the terminal apparatus 105.

The display unit 5040 is formed by an LED (Light Emitting Diode), an LCD (Liquid Crystal Display), or the like, and displays a screen based on various data. Note that the display unit 5040 may be formed by a touch display or the like to have a function of accepting various input operations from the user. That is, the display unit 5040 serves as an interface for accepting a data input or an operation instruction from the user, and may be an operation panel formed by a physical keyboard and buttons, a touch panel, or the like. The communication unit 5070 has the same function as that of the above-described communication unit 207, and can wirelessly be connected to another apparatus via the AP 106. The short-distance wireless communication unit 5080 is a device that can perform short-distance wireless communication with the short-distance wireless communication unit 208 using the same wireless communication method as that used by the short-distance wireless communication unit 208.

Note that the arrangements shown in FIGS. 2, 3, 4, and 15 are merely examples, and each apparatus may include a hardware component except for those shown in FIG. 2, 3, 4, or 15. In each of FIGS. 2, 3, 4, and 15, a plurality of blocks may be integrated into one block, and one block may be divided into two or more blocks. That is, each of the apparatuses shown in FIGS. 2, 3, 4, and 15 may have another arrangement as long as it is possible to execute processing (to be described later) according to this embodiment.

Figure 5:
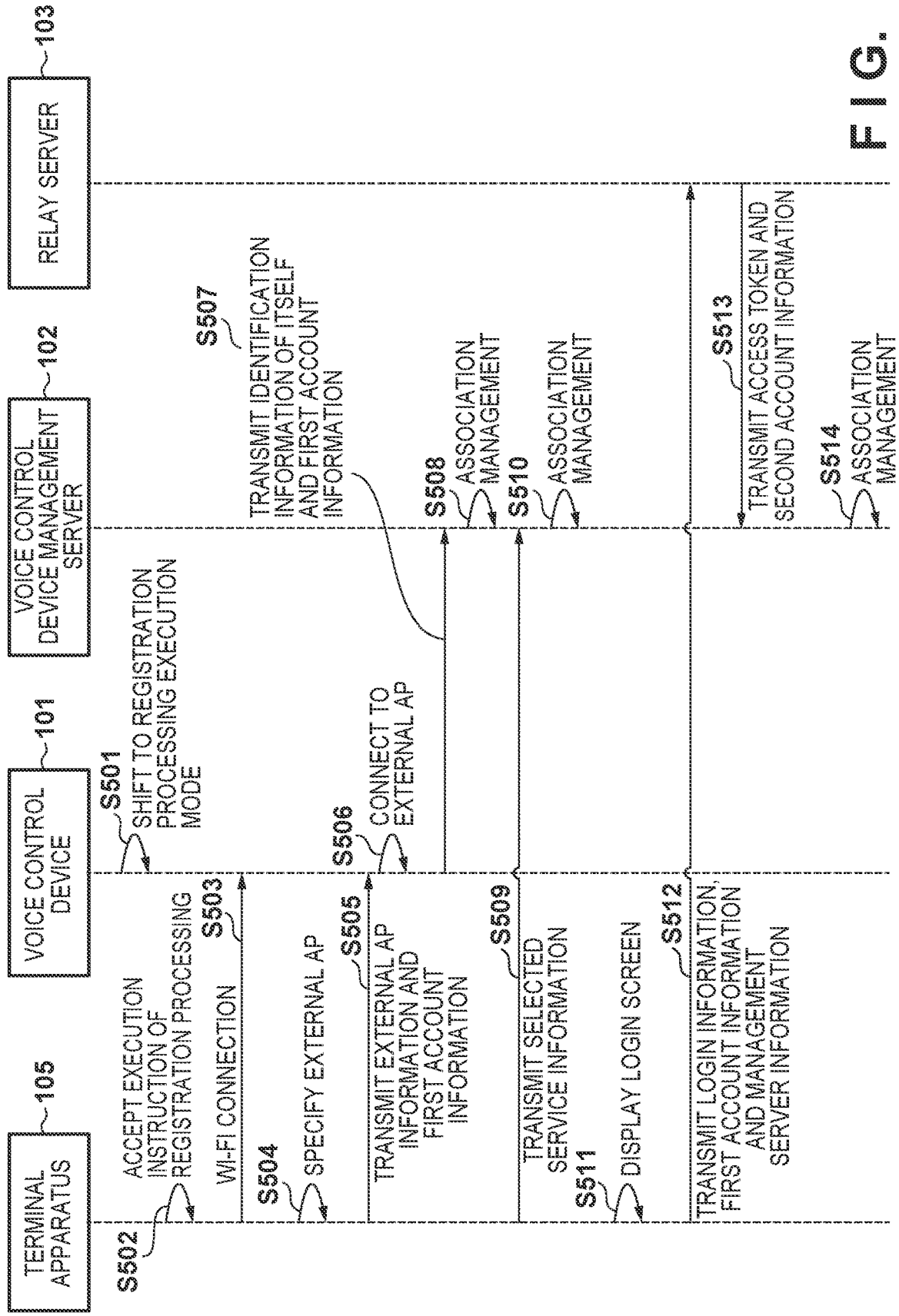
FIG. 5 is a sequence chart showing processing of associating the voice control device and the MFP with each other.

Registration processing of associating the voice control device 101 and the MFP 104 with each other in order for the user to use the service (the operation of this embodiment) of the printing system will be described next. FIG. 5 is a sequence chart showing the registration processing of associating the voice control device 101 and the MFP 104 with each other. Note that processing executed by each apparatus in this sequence is implemented when the CPU of each apparatus executes a program stored in the ROM or the like of each apparatus. Note that the program executed by the terminal apparatus 105 is the voice control application.

Before the registration processing is executed, the user logs in to a user account (to be referred to as the first account hereinafter) for the voice control device 101, which is managed by the voice control device management server 102, using the voice control application of the terminal apparatus 105. Thus, the voice control device management server 102 manages the terminal apparatus 105 and the first account in linkage with each other. Furthermore, the voice control device management server 102 recognizes information concerning the voice control application of the terminal apparatus 105 linked with the first account. The terminal apparatus 105 recognizes information (account name, ID, password, and the like) concerning the first account.

After that, in S501, the voice control device 101 accepts a predetermined operation from the user, and shifts to a mode of executing the registration processing. More specifically, the voice control device 101 enables its access point.

In S502, the terminal apparatus 105 accepts an execution instruction of the registration processing from the user by an input to a screen displayed by the voice control application. In S503, the terminal apparatus 105 is connected to the access point of the voice control device 101 by Wi-Fi.

In S504, the terminal apparatus 105 specifies an external access point that performs connection to the voice control device 101. More specifically, the terminal apparatus 105 searches for peripheral external access points, and displays a list of found external access points. The terminal apparatus 105 specifies an external access point selected from the list by the user. Note that a method of specifying the external access point is not limited to this. For example, the terminal apparatus 105 may receive, from the voice control device 101 via Wi-Fi connection, a list of external access points found by a search executed by the voice control device 101, and specify an external access point selected from the list by the user. Alternatively, for example, the terminal apparatus 105 may specify an external access point that is connected to the terminal apparatus 105 when accepting an execution instruction of the registration processing from the user.

In S505, the terminal apparatus 105 transmits, to the voice control device 101 via the Wi-Fi connection, information concerning the external access point specified in S504 and the above-described information concerning the first account. Note that after transmitting the information in S505, the terminal apparatus 105 may disconnect the Wi-Fi connection from the voice control device 101, and establish Wi-Fi connection to the external access point specified in S504.

Note that in the above description, the voice control device 101 receives the information necessary for the first registration processing by Wi-Fi. The present invention, however, is not limited to this. For example, the voice control device 101 may enable the Bluetooth function in the mode of executing the first registration processing, and receive the information necessary for the first registration processing by Bluetooth connection to the terminal apparatus 105.

In S506, the voice control device 101 disables its access point, and disconnects the Wi-Fi connection from the terminal apparatus 105. Then, the voice control device 101 is connected to the external access point by Wi-Fi based on the information concerning the external access point received from the terminal apparatus 105. Note that if Wi-Fi connection to the external access point succeeds, the voice control device 101 may make a notification of it by voice.

In S507, the voice control device 101 accesses the voice control device management server 102 via the external access point, and transmits, to the voice control device management server 102, the information concerning the first account received from the terminal apparatus 105 and identification information of itself.

In S508, the voice control device management server 102 manages the voice control device 101 and the first account in linkage with each other based on the received information. Note that the voice control device management server 102 already manages the terminal apparatus 105 and the first account in linkage with each other. Therefore, in S508, the voice control device 101, the terminal apparatus 105, and the first account are linked with each other.

In S509, the terminal apparatus 105 registers a service (skill) to be used with the voice control device 101. In this embodiment, since a print service using the voice control device 101 is used, a print service corresponding to the MFP 104 is registered. Thus, the terminal apparatus 105 transmits, to the voice control device management server 102, information indicating that the user has selected the print service corresponding to the MFP 104.

In S510, the voice control device management server 102 manages the print service corresponding to the MFP 104 and the first account in linkage with each other based on the received information. That is, the print service corresponding to the MFP 104 is registered.

In S511, the terminal apparatus 105 displays a login screen for logging in to a user account (to be referred to as the second account hereinafter) managed by the relay server 103 linked with the print service. The terminal apparatus 105 acquires information for displaying the login screen by, for example, accessing the relay server 103 linked with the print service. Note that a PC or the like that controls the MFP 104 has logged in to the second account, and the relay server 103 manages in advance the second account and the MFP 104 in linkage with each other.

In S512, the terminal apparatus 105 transmits, to the relay server 103, login information (ID, password, and the like) input to the login screen, the information concerning the first account, and information concerning the voice control device management server 102.

In S513, the relay server 103 determines whether the received login information is correct. If, as a result of the determination processing, the received login information is correct, and the login operation to the second account succeeds, the relay server 103 accesses the voice control device management server 102 based on the received information concerning the voice control device management server 102. The relay server 103 transmits, to the voice control device management server 102, an access token for permitting access by the first account and the information concerning the second account.

In S514, the voice control device management server 102 manages the first account and the second account in linkage with each other based on the received information.

This allows the voice control device management server 102 to manage each apparatus and each account in linkage with each other, and recognize specific information to be transmitted to a specific apparatus in notification processing according to this embodiment. Note that in the above description, the processes executed by the terminal apparatus 105 may be executed via, for example, a Web browser or the like provided in the terminal apparatus 105, instead of the voice control application.

In the above description, the authentication operation by the user has been exemplified as a method of associating the voice control device 101 and the MFP 104 with each other. However, another method that can associate the voice control device 101 and the MFP 104 with each other may be used.

A communication system according to this embodiment has a troubleshooting function. The troubleshooting function is a function for executing notification processing of notifying the user of contents of an error occurring in the MFP 104, a method of eliminating the error occurring in the MFP 104, and the like. In this embodiment, the voice control device 101 is used to execute the notification processing by voice by using, as a trigger, a voice instruction from the user. This can notify the user of notification information concerning the MFP 104 more easily.

Figure 6:
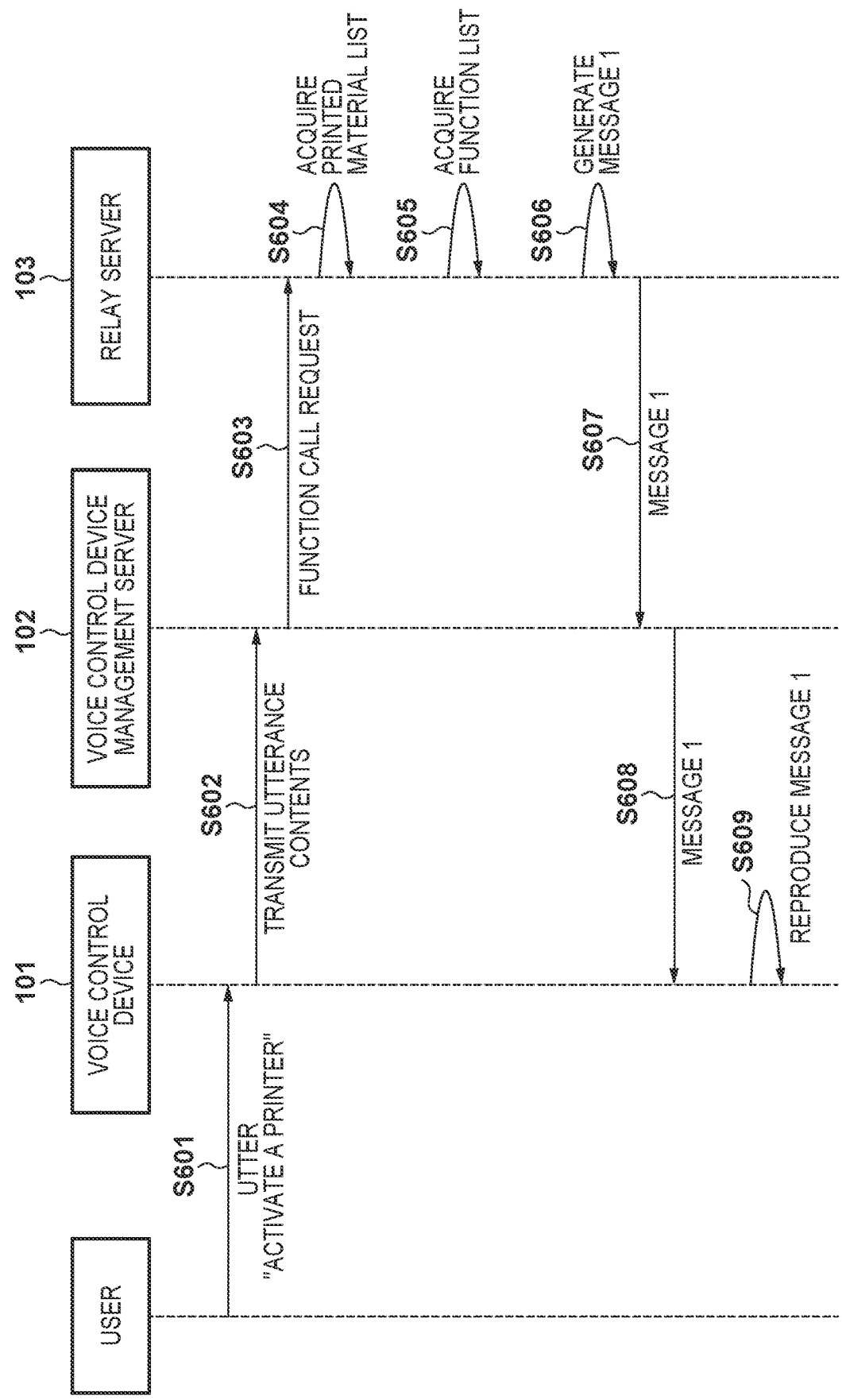
FIG. 6 is a sequence chart showing processing until the MFP executes troubleshooting.

Processing from when the user issues a voice instruction until the MFP 104 associated with the voice control device 101 executes troubleshooting will be described below with reference to FIGS. 6 and 7. The user utters "activate a printer" to the microphone 204 of the voice control device 101 in order to call a function for executing printing using the MFP 104 (S601). Utterance contents are registered in advance in the voice control device management server 102 as a keyword (activation phrase) to call the function for executing printing using the MFP 104. In addition, the utterance contents are registered in advance in the voice control device management server 102 as a keyword to transmit a request from the voice control device management server 102 to the relay server 103. The voice control device 101 transmits, to the voice control device management server 102, the utterance contents received in S601 (S602). In this transmission processing, voice data corresponding to the received utterance contents may be transmitted intact, or the voice data may be converted into text data in the voice control device 101 and then transmitted as text information of "activate a printer".

The voice control device management server 102 transmits, to the relay server 103 as a request destination associated with the received keyword "activate a printer", a function call request to operate the MFP 104 (S603). Upon receiving the function call request, the relay server 103 acquires a list (printed material list) of types of printed materials printable by the MFP 104 and a list (function list) of types of functions executable by the MFP 104 (S604 and S605). As for the printed material list, the relay server 103 holds fixed values as printed materials supportable by the control system of the printing apparatus (MFP 104). As for the function list, the relay server 103 holds fixed values as functions supportable by the control system of the printing apparatus (MFP 104). Note that the relay server 103 may acquire the printed material list and the function list from the MFP 104.

FIG. 9 shows an example of a table held in the relay server 103 and showing the printed material list. The table shown in FIG. 9 is held in, for example, the disk device 302. As an item 901 of the table, types of printed materials are listed as print targets. Referring to FIG. 9, as a list of the types of printed materials, "puzzle, coloring picture, writing paper, staff notation, and check list" are listed. Furthermore, as an item 902, an additional setting item is associated with each of the types of printed materials. In FIG. 9, "-" indicates an item in which no setting contents exist.

In S604, for example, the CPU 301 of the relay server 103 acquires information of "puzzle, coloring picture, writing paper, staff notation, and check list" as a list of types of printed materials with reference to the table shown in FIG. 9. The information of the table shown in FIG. 9 may be configured to be changed by the user of the relay server 103. For example, the user of the relay server 103 may be able to change (edit) the contents of each of the items 901 and 902 and an item 903 of the table shown in FIG. 9 on the UI screen displayed on the display unit 305.

In S604, the CPU 301 of the relay server 103 may be able to dynamically change the information acquired from the table shown in FIG. 9. For example, the above list information may be dynamically changed using attribute information of the sex, interest, and the like of the user and information concerning the paper size supported by the associated MFP 104. For example, if the age of the user is equal to or higher than a predetermined age, the information of the table shown in FIG. 9 may be filtered to exclude contents of "puzzle and coloring picture", and then acquired.

FIG. 10 shows an example of a table held in the relay server 103 and showing the function list. The table shown in FIG. 10 is held in, for example, the disk device 302. As an item 1001 of the table, types of operable functions are listed. Referring to FIG. 10, "printing, confirming state, copying, changing settings, performing troubleshooting, and turning on/off power" are listed as types of operable functions. Furthermore, as an item 1003, candidates of a settable value are associated as setting contents corresponding to each additional setting item 1002. For example, in FIG. 10, "1 to 99" is associated with the number of sheets. In addition, in FIG. 10, "-" indicates an item in which no setting contents exist.

The table information shown in FIG. 10 may be configured to be changed by the user of the relay server 103. For example, the user of the relay server 103 may be able to change (edit) the contents of each of the items 1001, 1002, and 1003 of the table shown in FIG. 10 on the UI screen displayed on the display unit 305.

In S605, the CPU 301 of the relay server 103 may be able to dynamically change the information acquired from the table shown in FIG. 10. For example, the above list information may be dynamically changed using information concerning the function use frequency of the user, the updated function, and the like. For example, if there is a function that has not been used by the user, the information of the table shown in FIG. 10 may be filtered to output only the function that has not been used by the user, and then acquired.

Subsequently, the relay server 103 generates message data (to also be simply referred to as a message 1 hereinafter) of the message 1 to be output by voice from the loudspeaker 201 of the voice control device 101 (S606). Contents of the message 1 correspond to an explanation to guide a work that can be done next by the user. For example, the message includes contents for accepting, from the user, selection from a list of functions executable by the MFP 104 based on the function list acquired in S605. More specifically, for example, the message includes contents of "You can use functions of printing, confirming state, copying, changing settings, performing troubleshooting, and turning on/off power. What do you want to do?".

Note that, for example, the message 1 may include a message including contents for accepting, from the user, selection from printed materials printable by the MFP 104 based on the printed material list acquired in S604. That is, in S606, a message may be generated based on both the printed material list acquired in S604 and the function list acquired in S605. For example, the message may include contents of "You can print puzzle, coloring picture, writing paper, staff notation, and check list by the printer. You can also use functions of printing, confirming state, copying, changing settings, performing troubleshooting, and turning on/off power. What do you want to do?".

The relay server 103 transmits the generated message 1 to the voice control device management server 102 (S607), and the voice control device management server 102 further transmits the received message 1 to the voice control device 101 (S608). The voice control device 101 notifies the user of the message 1 by outputting the received message 1 by voice from the loudspeaker 201 (S609).

After notifying the user of the message 1, the user utters a response to the message 1 to the voice control device 101 (S610). More specifically, for example, the user utters contents indicating the printed material selected from the printed material list by himself/herself or contents indicating the function selected from the function list by himself/herself.

After that, the voice control device 101 transmits utterance contents received in S610 to the voice control device management server 102 (S611). In this transmission processing, voice data corresponding to the received utterance contents may be transmitted intact, or the voice data may be converted into text data in the voice control device 101 and then transmitted as text information. Then, the voice control device management server 102 notifies the relay server 103 of the function selected by the user or the printed material selected by the user by transmitting the received data to the relay server 103 (S612).

Note that a case in which the user selects the troubleshooting function from the list of functions executable by the MFP 104 will be described below. Thus, in S610, the user utters, to the voice control device 101, a voice message to select the troubleshooting function from the functions presented by the message 1 notified in S609. Processing in this case will be described with reference to FIGS. 7A and 7B.

However, for example, if the user selects the printed material in S610, upon receiving the notification in S612, the relay server 103 transmits, to the MFP 104, a print instruction to print the printed material selected by the user. This causes the MFP 104 to print the printed material selected by the user.

In S701 of FIGS. 7A and 7B, the relay server 103 generates message data (to also be simply referred to as a message 2 hereinafter) of the message 2 to be output by voice from the loudspeaker 201 of the voice control device 101 (S701). Contents of the message correspond to an explanation of the troubleshooting function to the user. For example, the message may include contents that prompt the user to give utterance, like "You can ask about any trouble. Are you having a trouble with something?". If the user uses the troubleshooting function for the first time, the message may include a detailed explanation of the troubleshooting function and an utterance example, like "You can ask about any trouble or error in use of the printer. Please explain the status or state of the trouble like "color of the printed material is missing". Are you having a trouble with something?".

If the message 2 is generated in S701, the relay server 103 transmits the generated message 2 to the voice control device management server 102 (S702), and the voice control device management server 102 further transmits the received message 2 to the voice control device 101 (S703). The voice control device 101 notifies the user of the message 2 by outputting the received message 2 by voice from the loudspeaker 201 (S704).

Subsequently, the user utters, as utterance contents to the voice control device 101, a phenomenon or event that hinders the operation of the MFP 104 instead of a clear execution instruction to the MFP 104 (S705). The phenomenon or event that hinders the operation of the MFP 104 is information concerning the state of the MFP 104. A practical example of the information is information concerning the state of the printed material output from the MFP 104, like information of "color of the printed material is missing". The voice control device 101 transmits the utterance contents received in S705 to the voice control device management server 102 (S706). As a transmission method, voice data or text data may be transmitted, similar to S602. The voice control device management server 102 specifies, based on the data received from the voice control device 101 in S706, a trouble corresponding to the data received in S706 and occurring (highly likely) in the MFP 104, and transmits a request concerning the specified trouble to the relay server 103 (S707). Note that the trouble occurring in the MFP 104 may be interpreted as an error occurring in the MFP 104. A method of specifying a trouble occurring in the MFP 104 will be described below. The utterance contents corresponding to the data transmitted in S706 are contents of the trouble (malfunction) recognized by the user, and there are various utterance expression methods. In this embodiment, the voice control device management server 102 includes a table for specifying a trouble in accordance with a word/combination of words included in the utterance contents, as shown in FIG. 11. In S707, the voice control device management server 102 specifies a function call request of an item 1101 corresponding to the utterance contents in S705.

FIG. 11 shows an example of a table held in the voice control device management server 102. The table shown in FIG. 11 is held in, for example, the disk device 302. As the item 1101 of the table, troubles that can occur in the MFP 104 are listed. More specifically, in FIG. 11, troubles such as "color trouble, noise trouble, and serial number trouble" are listed as troubles that can occur in the MFP 104. In an item 1102, an utterance expression method corresponding to each trouble is prepared as an utterance template. The utterance template stores a variable value, and variable values 1103 and 1104 are combined to generate an utterance template. In FIG. 11, "-" indicates an item in which no setting contents exist. The number of variable values is dynamic, and increases/decreases in accordance with contents of the utterance template 1102. If the utterance contents corresponding to the data transmitted in S706 do not correspond to any of the utterance templates of the item 1102, a message to change the utterance contents of the user, like "There is no corresponding resolution method. Try to reword the contents of the trouble", may be generated and transmitted to the voice control device 101.

Upon receiving the request concerning the trouble occurring in the MFP 104 and specified using the above table, the relay server 103 confirms (S708) the status of the MFP 104 based on the specified trouble, and confirms (S710) troubleshooting execution history data held in the relay server 103. In this embodiment, by executing the processes in S708 and S710, it is possible to more correctly specify processing (troubleshooting) for solving the trouble recognized by the user, and guide the user to a solution by outputting a voice.

To confirm the status of the MFP 104, the relay server 103 transmits a status confirmation request to the MFP 104 (S708). Upon receiving the status confirmation request, the MFP 104 returns status information (state information) of the MFP 104 to the relay server 103 (S709). Note that the status confirmation request transmitted to the MFP 104 may include information concerning the trouble specified based on the table shown in FIG. 11. Then, the MFP 104 may dynamically change the status information to be returned in S709 for each trouble specified based on the table shown in FIG. 11, or may always return all the status information. The status information includes, for example, a status concerning ink (printing material) held by the MFP 104, a status concerning a printhead provided in the MFP 104, and a status concerning a sheet (print medium) held by the MFP 104. If, for example, the trouble specified based on the table shown in FIG. 11 is a color trouble, and the relay server 103 receives a request corresponding to the color trouble, the MFP 104 may transmit only a status concerning ink. Note that the status concerning ink includes, for example, an ink low status, an ink non-attached status, and a normal status. The ink low status is status information representing a state in which the remaining amount of ink of an ink tank of the printer unit 401 is below a predetermined numerical value. The ink non-attached status is status information representing a state in which no ink tank is attached to the printer unit 401. The normal status is status information representing a state in which the remaining amount of ink of the ink tank of the printer unit 401 exceeds the predetermined numerical value.

To confirm the troubleshooting execution history, the relay server 103 acquires execution history data saved in the disk device 302 or the memory 304 of the relay server 103 (S710, acquisition of execution history information). The execution history data is execution information concerning the number of times and time of execution of the troubleshooting in the past. Note that at this time, only execution information related to the trouble specified based on the table shown in FIG. 11 may be acquired or execution information related to all troubles may be acquired. Execution information related to the color trouble is, for example, information concerning the number of times and time of execution of head cleaning of the print head by the MFP 104 in the past. Execution information related to a paper jam trouble is, for example, information concerning the number of times and time of resolution of a paper jam by the operation of the MFP 104 in the past. Note that a paper jam is solved by removing a jamming sheet by detaching the back cover of the main body of the MFP 104 or pulling out a jamming sheet from the discharge port of the main body of the MFP 104. The execution information may be acquired from, for example, the MFP 104.

Subsequently, the relay server 103 generates a guide message to return a response to the user (S711). A guide message may be generated using the trouble specified based on the table shown in FIG. 11, using the status information acquired from the MFP 104, or using the execution history data saved in the disk device 302 or the memory 304 of the relay server 103. More specifically, in S711, the relay server 103 generates a guide message based on a table shown in FIG. 12.

In the table shown in FIG. 12, a priority value (priority level) is defined for each status corresponding to the trouble specified based on the table shown in FIG. 11. The relay server 103 generates a guide message based on status contents with the highest priority value among the status contents corresponding to the acquisition results in S709 and S710. For example, assume that the status specified based on the status information acquired in S709 is the ink low status, and the execution time of the last head cleaning specified based on the information acquired in S710 is in a predetermined period before the user utters (S705). In this case, "ink low status" and "close to execution time of head cleaning" correspond to the status contents of an item 1203 corresponding to the acquisition results in S709 and S710. Then, in an item 1202, a higher priority value is defined for "ink low status". Therefore, the relay server 103 generates a guide message including contents of "Replace ink" of an item 1204 corresponding to "ink low status" of the item 1203. Each guide message of the item 1204 shown in FIG. 12 includes a message that prompts the user to execute the troubleshooting, or a message that confirms whether the relay server 103 can instruct the MFP 104 to execute the troubleshooting. Note that the guide message that confirms whether the relay server 103 can instruct the MFP 104 to execute the troubleshooting is linked with identification information of the troubleshooting in the MFP 104. If the item 1204 is specified, the CPU 301 of the relay server 103 can cause the MFP 104 to execute the troubleshooting identified by the identification information. Note that if the guide message that prompts the user to execute the troubleshooting is transmitted, the user instructs the MFP 104 to execute the troubleshooting, and thus processing of instructing execution of the troubleshooting is not performed by the relay server 103. Note that if the trouble specified based on the table shown in FIG. 11 is the paper jam trouble, a guide message based on the acquisition results in S709 and S710 is generated with reference to the table shown in FIG. 12. Note that a guide message may be generated in accordance with the number of times of execution of the troubleshooting within the predetermined period before the user utters (S705). More specifically, for example, if paper jam resolution processing is executed 0 times within the predetermined period before the user utters (S705), a guide message with a priority value of 0 is generated in FIG. 12. If the paper jam resolution processing is executed once within the predetermined period, a guide message with a priority value of 50 is generated in FIG. 12. If the paper jam resolution processing is executed twice or more within the predetermined period, a guide message with a priority value of 100 is generated in FIG. 12.

Assume that the status specified based on the status information acquired in S709 is the normal status and the execution time of last head cleaning specified based on the information acquired in S710 is in the predetermined period before the user utters (S705). In this case, "close to execution time of head cleaning" corresponds to the status contents of the item 1203 corresponding to the acquisition results in S709 and S710. Thus, in S711, the relay server 103 generates a guide message including contents of "Are you sure you want to execute strong head cleaning?". Alternatively, assume that the status specified based on the status information acquired in S709 is the normal status and the time of head cleaning specified in S710 is the predetermined period or more before the user utters (S705). In this case, "far from execution time of head cleaning" corresponds to the status contents of the item 1203 corresponding to the acquisition results in S709 and S710. Thus, in S711, the relay server 103 generates a guide message including contents of "Are you sure you want to execute normal head cleaning?". Note that in normal head cleaning, a time taken for cleaning is short or an ink suction amount at the time of cleaning is large, as compared with strong head cleaning. That is, the cleaning effect of strong head cleaning is higher than that of normal head cleaning. As described above, in this embodiment, specific processing of troubleshooting concerning the printhead to be executed is specified based on the execution history information. Then, the MFP 104 is instructed to execute the thus specified troubleshooting. This executes strong head cleaning when, for example, a trouble occurs even though only a short time elapses since the execution time of last head cleaning. This form can prevent a trouble from occurring again within a short time.

The guide message 1204 may include contents of confirming an instruction of execution of the troubleshooting of the MFP 104, contents of making a notification of a resolution method, or contents of prompting the user to select an execution instruction from two or more execution instruction contents. Contents other than the operation of the MFP 104 may also be included. The guide message may dynamically be generated or may be generated by a combination of a plurality of status contents.

The relay server 103 transmits the generated guide message to the voice control device management server 102 (S712), and the voice control device management server 102 transmits the guide message to the voice control device 101 (S713). The voice control device 101 notifies the user of the guide message by outputting the received guide message by voice from the loudspeaker 201 (S714).

Subsequently, if the guide message reproduced in S714 presents contents of confirming the instruction of execution or contents of prompting the user to select the execution instruction from two or more execution instruction contents, the user utters whether to issue an execution instruction. Assume, for example, that "Are you sure you want to execute head cleaning?" is output to the user by voice with the guide message concerning the color trouble. In this case, if the user utters "YES" as contents of permitting execution (S715), the voice control device 101 transmits the utterance contents received in S715 to the voice control device management server 102 (S716). As a transmission method here, voice data or text data may be transmitted, similar to S602. Then, based on the execution permission, the voice control device management server 102 transmits, to the relay server 103, a function call request to execute the troubleshooting in the MFP 104 (S717). The transmitted function call request includes identification information of the troubleshooting (for example, identification information of head cleaning) corresponding to the guide message.

Upon receiving the function call request in S717, the relay server 103 generates message data (to also be simply referred to as a message 3 hereinafter) of the message 3 to be output by voice from the loudspeaker 201 of the voice control device 101 (S718). Contents of the message 3 correspond to an explanation of execution contents of the troubleshooting in the MFP 104 to the user. For example, the message 3 is a message of, for example, "Head cleaning will be executed".

The relay server 103 transmits the generated message 3 to the voice control device management server 102 (S719), and the voice control device management server 102 further transmits the received message 3 to the voice control device 101 (S720). The voice control device 101 notifies the user of the message 3 by outputting the received message 3 by voice from the loudspeaker 201 (S721).

If the guide message does not present, in S715, contents of confirming the execution instruction or contents of prompting the user to select the execution instruction from two or more execution instruction contents (for example, the user utters "NO"), the message 2 to be output by voice from the loudspeaker 201 of the voice control device 101 may be generated. Alternatively, for example, a message including contents of further prompting the user to utter, such as "Are you having any other trouble?", may be generated.

If the relay server 103 receives the function call request in S717, it generates execution instruction data of the troubleshooting with respect to the MFP 104 (S722). Then, the relay server 103 uses the generated execution instruction data to instruct the MFP 104 to execute the troubleshooting (for example, head cleaning) corresponding to the trouble occurring in the MFP 104 (S723). When issuing an execution instruction, the relay server 103 saves execution contents and execution time in the disk device 302 or the memory 304 as execution history data. Upon accepting the execution instruction, the MFP 104 executes the troubleshooting based on contents of the execution instruction.

As described with reference to FIGS. 7A and 7B, the voice control device management server 102 specifies the type of trouble based on the utterance contents in S706, and transmits information concerning the specified trouble to the relay server 103. Then, upon receiving the information in S707, the relay server 103 acquires the status information of the MFP 104 in S708 and S709, and acquires the troubleshooting execution history data of the MFP 104 in S710. The relay server 103 generates, based on the acquired information, guidance including contents of the troubleshooting to be executed.

Figure 14:
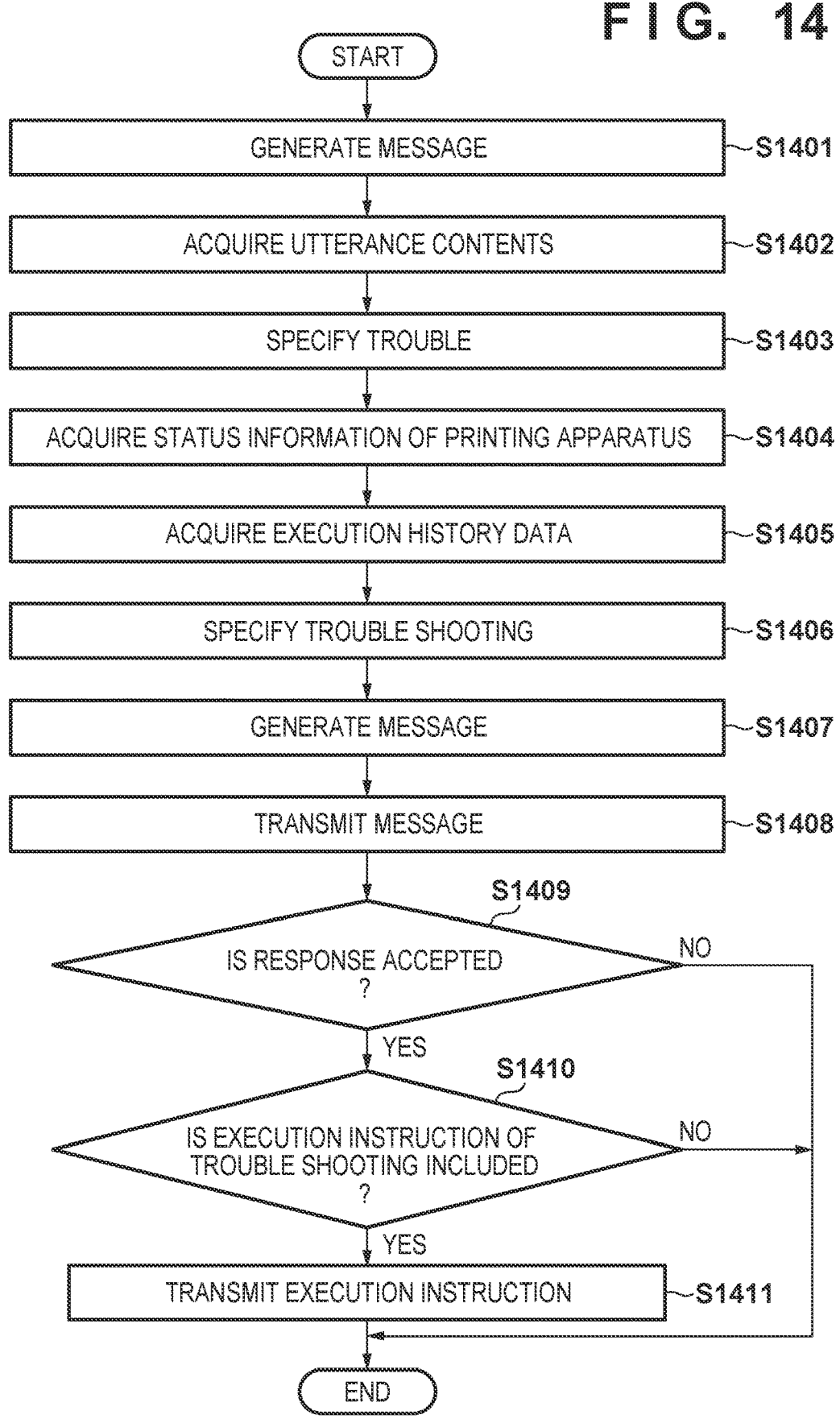
FIG. 14 is a flowchart illustrating processing until troubleshooting is specified.

FIG. 14 is a flowchart illustrating the above processes of the voice control device management server 102 and the relay server 103. With reference to FIG. 14, the above processes will be described as processing of one server system including the voice control device management server 102 and the relay server 103. The processing shown in FIG. 14 is implemented when, for example, the CPU 301 reads out a program stored in the disk device 302 into the memory 304 and executes the program. Note that the processing shown in FIG. 14 is processing after the relay server 103 is notified that the user has selected the troubleshooting function (S612).

In step S1401, the CPU 301 generates the message 1 for explaining the troubleshooting function to the user. After that, the CPU 301 transmits the message 1 to the voice control device 101. This processing corresponds to the processes in S701 to S703.

In step S1402, the CPU 301 acquires utterance contents. For example, as described with reference to S706 of FIGS. 7A and 7B, the CPU 301 acquires utterance contents of the user based on voice data received from the voice control device 101.

In step S1403, the CPU 301 specifies a trouble occurring in the MFP 104 based on the utterance contents acquired in step S1402. For example, as described with reference to S707 of FIGS. 7A and 7B and FIG. 11, the CPU 301 specifies a trouble corresponding to a combination of words included in the utterance contents, for example, a color trouble.

In step S1404, the CPU 301 acquires the status information of the MFP 104 from the MFP 104. For example, as described with reference to S708 and S709 of FIGS. 7A and 7B, the status information of the MFP 104 is acquired by transmitting a status information confirmation request to the MFP 104.

In step S1405, the CPU 301 acquires troubleshooting execution history data of the MFP 104. For example, as described with reference to S710 of FIGS. 7A and 7B, the CPU 301 acquires the execution history data saved in the disk device 302 or the memory 304 of the relay server 103.

In step S1406, the CPU 301 specifies processing for solving the trouble, that is, troubleshooting based on the status information of the MFP 104 acquired in S1404 and the execution history data acquired in S1405. For example, as described with reference to S711 of FIGS. 7A and 7B, in the specified trouble, for example, the color trouble, ink replacement corresponding to the ink low status is specified.

In step S1407, the CPU 301 generates a message based on the troubleshooting specified in step S1406. In step S1408, the CPU 301 transmits the message generated in step S1407 to the voice control device 101.

In step S1409, the CPU 301 determines whether a response to the message generated in step S1407 is accepted. If the message generated in step S1407 is not, for example, a message for accepting a response like a message for prompting the user to replace ink, no response is accepted. If the CPU 301 does not accept a response to the message generated in step S1407, the processing shown in FIG. 14 ends. On the other hand, if the CPU 301 accepts a response to the message generated in step S1407, the process advances to step S1410.

In step S1410, the CPU 301 determines whether the accepted response includes an execution instruction of the troubleshooting specified in step S1406. More specifically, if the response of the user is an utterance indicating affirmation, such as "YES", it is determined that the accepted response includes the execution instruction of the troubleshooting specified in step S1406. On the other hand, if the response of the user is an utterance indicating negation, such as "NO", it is determined that the accepted response includes no execution instruction of the troubleshooting specified in step S1406. If the accepted response includes no execution instruction of the troubleshooting specified in step S1406, the CPU 301 ends the processing shown in FIG. 14 without executing the troubleshooting. On the other hand, if the accepted response includes the execution instruction of the troubleshooting specified in step S1406, the CPU 301 advances to step S1411. In step S1411, the CPU 301 transmits the execution instruction of the troubleshooting specified in step S1406 to the MFP 104. After that, the processing shown in FIG. 14 ends.

The order of the processes explained with reference to FIG. 14 is not limited to the order of steps S1401 to S1411. For example, the trouble specifying processing in step S1403 may be executed after the execution history data is acquired in step S1405.

As described above, according to this embodiment, when the user utters a phenomenon occurring in the printing apparatus without concretely instructing the operation of the printing apparatus, a voice concerning the phenomenon, for example, guidance for solving a malfunction is output. As a result, it is possible to improve the convenience of the user.

Second Embodiment

With respect to an operation performed when the user selects a troubleshooting function from a function list presented by a message 1 notified in S609, the difference from the first embodiment will be described below with reference to FIG. 8.

Figure 8:
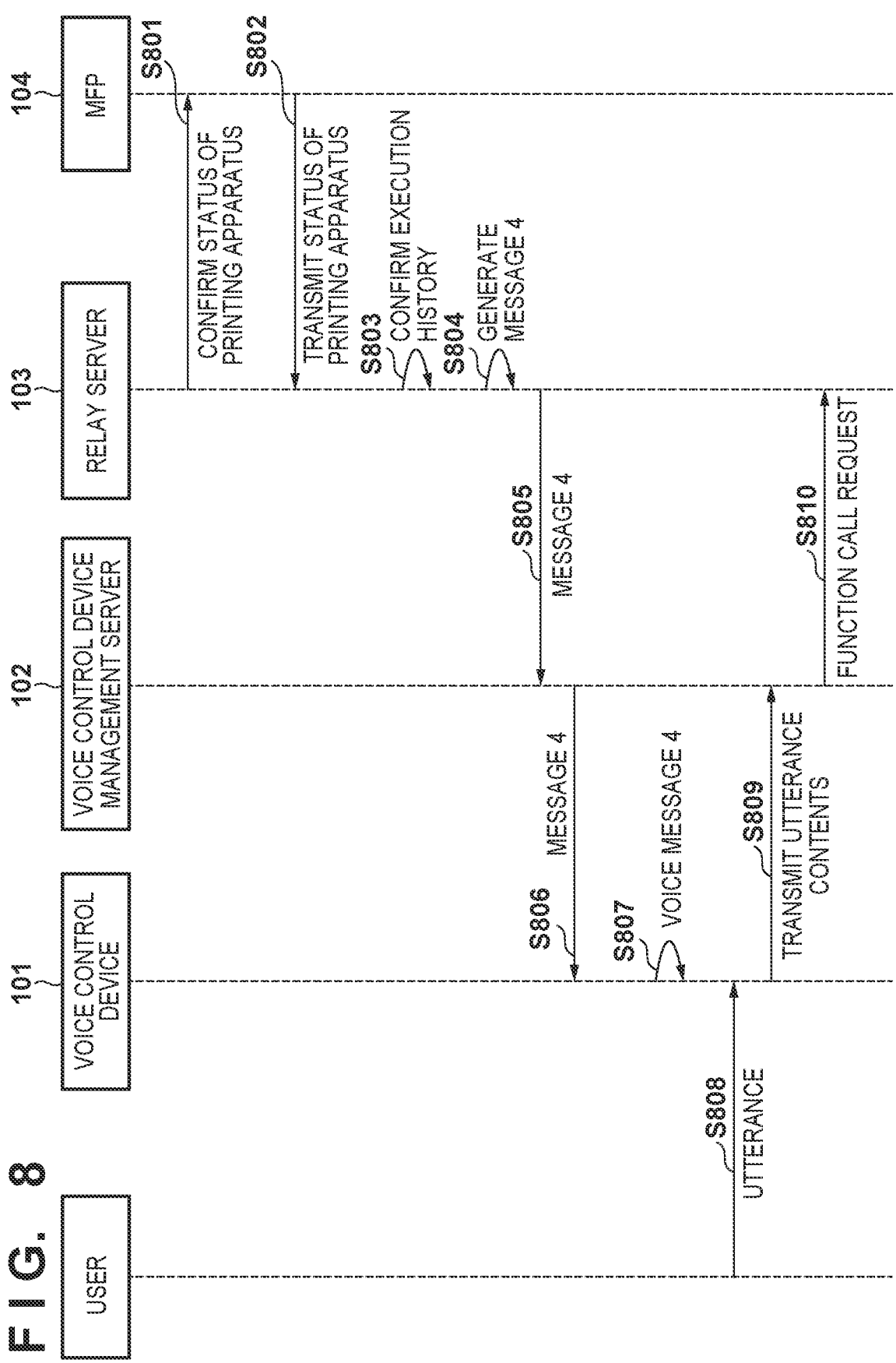
FIG. 8 is a sequence chart showing processing until an MFP executes troubleshooting.

In S801 of FIG. 8, to confirm the status of an MFP 104, a relay server 103 transmits a status confirmation request to the MFP 104. Upon receiving the status confirmation request, the MFP 104 returns the status information of the MFP 104 to the relay server 103 (S802).

To confirm a troubleshooting execution history, the relay server 103 acquires, from execution history data saved in a disk device 302 or a memory 304 of the relay server 103, data related to the status information acquired in S802 (S803). If, for example, an ink low status is acquired in S802, the relay server 103 acquires head cleaning execution information in S803.

Subsequently, the relay server 103 specifies a trouble occurring in the MFP 104 based on the information acquired in S801, and generates a message 4 for confirming with the user whether the specified trouble has occurred (S804). At this time, the relay server 103 sets the priority levels of troubles to be confirmed with the user. The default priority levels are as shown in a table of FIG. 13. The relay server 103 raises the priority level of the trouble specified based on the information acquired in S801. Note that at this time, the priority level may be changed based on a troubleshooting execution history corresponding to the trouble specified based on the information acquired in S801. That is, for example, as the number of times of executing of troubleshooting during a predetermined period is larger, the relay server 103 may set the priority level higher. If, for example, the information acquired in S801 is information indicating the ink low status, the priority level of the color trouble is raised. Note that if status information concerning a plurality of troubles is acquired, the priority levels of the plurality of troubles are raised. After setting the priority level of each trouble in this way, the relay server 103 specifies the trouble with the highest priority level as a trouble to be confirmed with the user, and generates the message 4 based on the trouble with the highest priority level. Note that the priority value of an item 1302 may not be a fixed value and may be changeable (editable) by the user of the relay server 103.

Note that even if no abnormality is recognized in the main body of the MFP 104, it may be impossible to execute a printing function such as cloud print due to a factor other than the MFP 104. If, for example, the status information acquired in S802 indicates a normal status, and the execution history data acquired in S803 indicates that no troubleshooting is executed during the predetermined period, no abnormality is recognized in the main body of the MFP 104, and thus the priority levels remain unchanged. In this case, referring to FIG. 13, a cloud print trouble has the highest priority value 1302. Therefore, in this case, "Can't cloud print be executed successfully?" is generated as the message 4.

After the trouble is specified with reference to FIG. 13, the message 4 may be generated using the table shown in FIG. 12 corresponding to the specified trouble. If, for example, the status information acquired in S802 indicates the ink low status, the message 4 including contents of "Replace ink" may be generated in S804.

The relay server 103 transmits the generated message 4 to a voice control device management server 102 (S805), and the voice control device management server 102 further transmits the message 4 to a voice control device 101 (S806). The voice control device 101 notifies the user of the message 4 by outputting the received message 4 by voice from the loudspeaker 201 (S807).

The user utters, to the voice control device 101, a response to the message 4 in S807 (S808). The voice control device 101 transmits utterance contents received in S808 to the voice control device management server 102 (S809). As a transmission method here, voice data or text data may be transmitted, similar to S602. Then, the voice control device management server 102 transmits information based on the utterance contents to the relay server 103 (S810). If, for example, the user utters to indicate affirmation like "YES" in S808 to "Is color of the printed material missing?" as the message 4, the voice control device management server 102 transmits, in S810, to the relay server 103, information indicating that the trouble confirmed with the user is correct. Note that if the user utters to indicate negation like "NO" in S808, the voice control device management server 102 transmits, in S810, to the relay server 103, information indicating that the trouble confirmed with the user is incorrect. After S810, the same processes as in S718 to S723 of FIGS. 7A and 7B are performed. For example, a message of "Head cleaning will be executed" is generated in S718, and output by voice from the voice control device 101 in S721. Then, execution instruction data of the troubleshooting is generated in S722, and the generated execution instruction data is used to instruct the MFP 104 to execute the troubleshooting in S723.

Figure 7A:
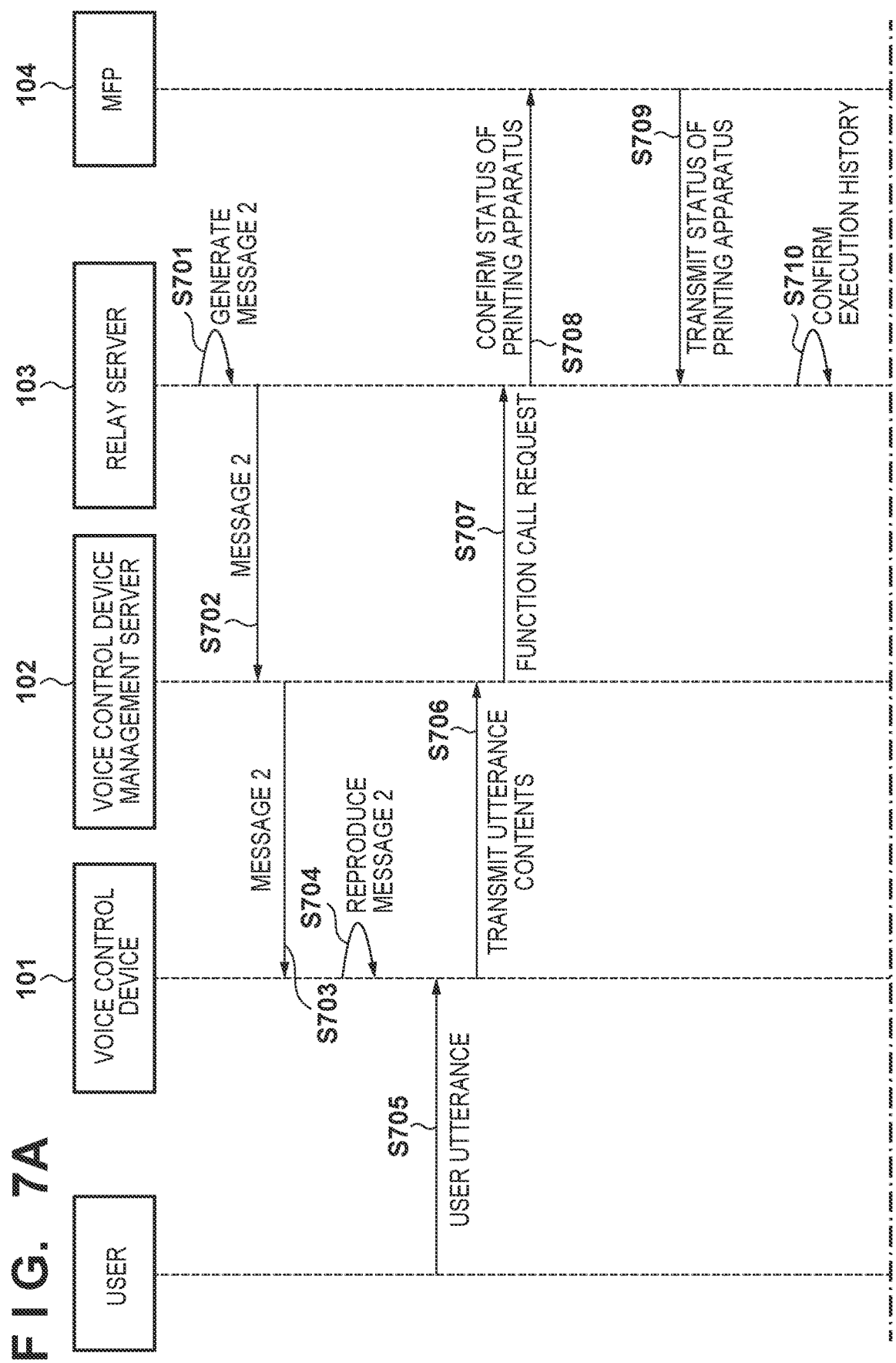

After S810, the same processes as in S711 to S723 of FIGS. 7A and 7B may be performed. That is, after a message including contents of prompting the user to confirm execution of the troubleshooting in the MFP 104 is generated and the user permits execution, the MFP 104 may be instructed to execute the troubleshooting.

If the user utters to indicate negation like "NO" in S808, the processes from S701 of FIGS. 7A and 7B may be performed. That is, a message including contents of prompting the user to utter, such as "You can ask about any trouble. Are you having a trouble with something?", may be generated.

As described above, according to this embodiment, without concretely instructing the operation of the printing apparatus by the user or without uttering a phenomenon occurring in the printing apparatus, a voice concerning the phenomenon occurring in the printing apparatus, for example, guidance for solving a malfunction is output. As a result, it is possible to improve the convenience of the user.

Figure 16:
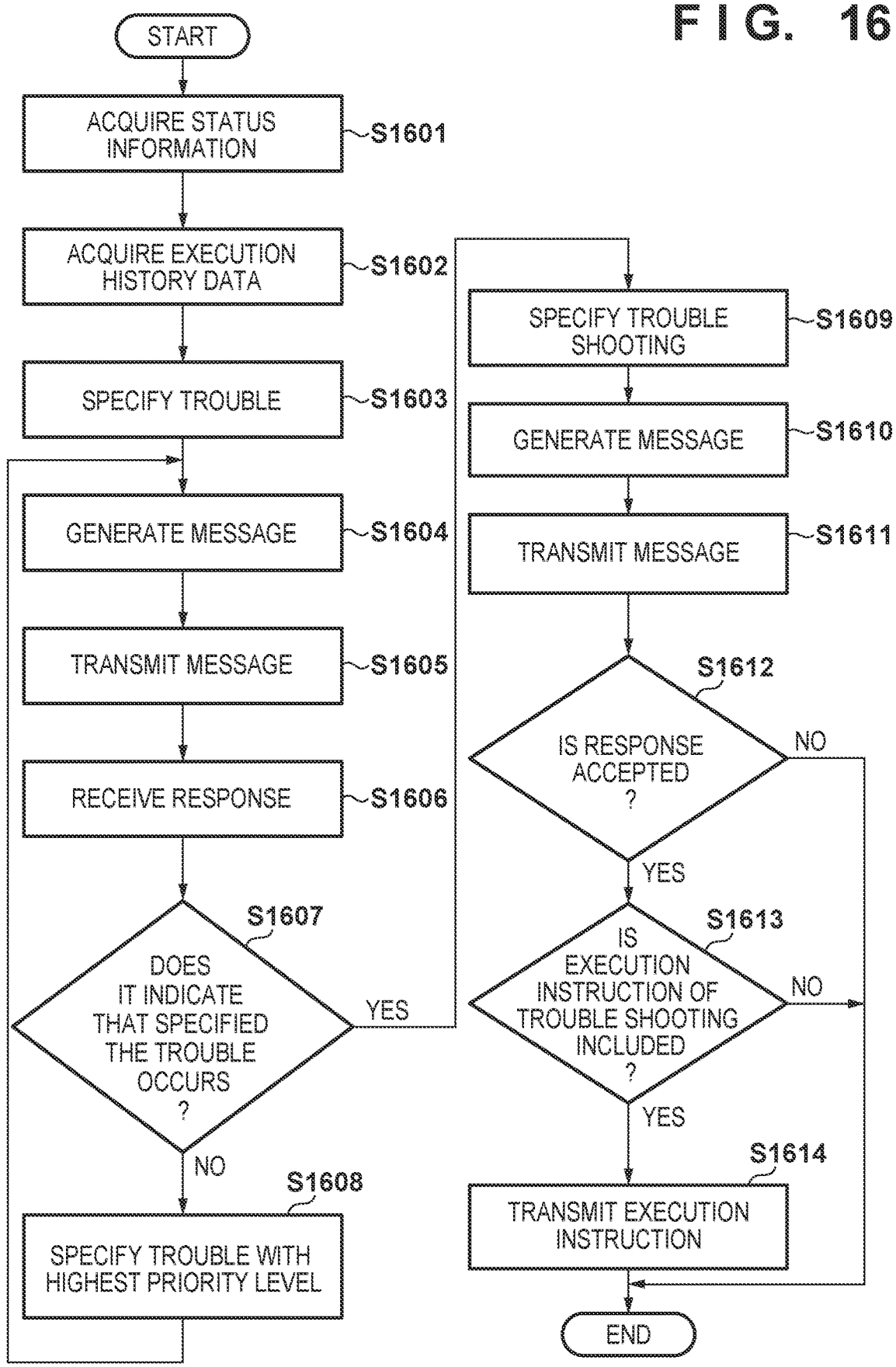
FIG. 16 is a flowchart illustrating processing until troubleshooting is specified.

FIG. 16 is a flowchart illustrating the above processes of the voice control device management server 102 and the relay server 103. With reference to FIG. 16, the above processes will be described as processing of one server system including the voice control device management server 102 and the relay server 103. The processing shown in FIG. 16 is implemented when, for example, a CPU 301 reads out a program stored in the disk device 302 into the memory 304 and executes the program. Note that the processing shown in FIG. 16 is processing after the relay server 103 is notified (S612) that the user has selected the troubleshooting function.

In step S1601, the CPU 301 acquires status information from the MFP 104. This processing corresponds to S801 and S802. In step S1602, the CPU 301 acquires execution history data. This processing corresponds to S803.

In step S1603, the CPU 301 specifies a trouble occurring (highly likely) in the MFP 104 using the status information acquired in step S1601 and the table shown in FIG. 13. Note that at this time, as described above, the priority level of each trouble is set using the table shown in FIG. 13. The trouble specified at this time is a trouble with the highest priority level.

In step S1604, the CPU 301 generates the message 4 to confirm with the user whether the trouble specified in step S1603 has occurred. This processing corresponds to S804. In step S1605, the CPU 301 transmits the message 4 generated in step S1604 to the voice control device 101. This processing corresponds to S805 and S806. In step S1606, the CPU 301 receives a response to the message 4 from the voice control device 101. This processing corresponds to S809.

In step S1607, the CPU 301 determines whether the response to the message 4 indicates that the trouble specified in step S1603 has occurred. More specifically, if the response of the user is an utterance indicating affirmation, such as "YES", the response to the message 4 is determined to indicate that the trouble specified in step S1603 has occurred. On the other hand, if the response of the user is an utterance indicating negation, such as "NO", the response to the message 4 is determined to indicate that the trouble specified in step S1603 has not occurred. If the response to the message 4 is determined to indicate that the trouble specified in step S1603 has not occurred, the CPU 301 advances to step S1608. On the other hand, if the response to the message 4 indicates that the trouble specified in step S1603 has occurred, the CPU 301 advances to step S1609.

In step S1608 executed when NO is determined in step S1607, the CPU 301 specifies, using the table shown in FIG. 13, the trouble with the highest priority level among the troubles which have not been specified (of which the user has not been notified). After that, the process returns to step S1604. Note that in the processes after step S1604 that refer to the trouble specified in step S1603 and are executed again, the trouble specified in step S1614 is referred to, instead of the trouble specified in step S1603.

In step S1609 executed when YES is determined in step S1607, the CPU 301 specifies processing for solving the trouble specified in step S1603, that is, troubleshooting, based on the status information of the MFP 104 acquired in step S1601 and the execution history data acquired in step S1602.

In step S1610, the CPU 301 generates a message based on the troubleshooting specified in step S1609. In step S1611, the CPU 301 transmits the message generated in step S1610 to the voice control device 101. In step S1612, the CPU 301 determines whether a response to the message generated in step S1610 is accepted. If no response to the message generated in step S1610 is accepted, the CPU 301 ends the processing shown in FIG. 16. On the other hand, if the response to the message generated in step S1610 is accepted, the CPU 301 advances to step S1613.

In step S1613, the CPU 301 determines whether the accepted response includes an execution instruction of the troubleshooting specified in step S1609. If the accepted response includes no execution instruction of the troubleshooting specified in step S1609, the CPU 301 ends the processing shown in FIG. 16 without executing the troubleshooting. On the other hand, if the accepted response includes the execution instruction of the troubleshooting specified in step S1609, the CPU 301 advances to step S1614. In step S1614, the CPU 301 transmits the execution instruction of the troubleshooting specified in step S1609 to the MFP 104. After that, the processing shown in FIG. 16 ends.

With this form, it is possible to specify the trouble occurring in the MFP 104, and execute processing for solving the trouble.

Other Embodiments

In the above description, the voice control device management server 102 transmits a message to the voice control device 101, thereby notifying the user of contents corresponding to the message by voice. Note that at this time, a control may be executed to make a notification using the screen of the terminal apparatus 105 of the user in addition to the notification by voice. More specifically, for example, when transmitting the message to the voice control device 101, the voice control device management server 102 transmits screen data to the terminal apparatus 105. This makes, using the screen of the terminal apparatus 105, a notification of the same contents as those notified by voice from the voice control device 101. Note that since the voice control device management server 102 stores the address of the terminal apparatus 105 in registration processing, it can transmit data to the terminal apparatus 105. With this arrangement, for example, if the user has no knowledge about head cleaning, the user can obtain knowledge about head cleaning by displaying an explanation of head cleaning as screen data. Note that contents notified by voice from the voice control device 101 may be different from contents notified using the screen of the terminal apparatus 105. For example, a notification of contents more detailed than the contents notified by voice from the voice control device 101 may be made using the screen of the terminal apparatus 105. The contents notified by voice from the voice control device 101 are decided in accordance with the priority level using FIG. 12 or 13. However, the contents notified using the screen of the terminal apparatus 105 may include all the messages corresponding to the status of the MFP 104 and the execution information.

In the above description, the form in which the processing is executed by the server system including the voice control device management server 102 and the relay server 103 has been explained. The present invention, however, is not limited to this. For example, a form in which the server system includes only one of the voice control device management server 102 and the relay server 103 and one server executes all the processes that are executed by the respective servers in the above description may be adopted. For example, the voice control device management server 102 may have only a function of relaying communication between the voice control device 101 and the relay server 103, and the relay server 103 may execute all the determination processes and the specifying processes that are executed by the respective servers in the above description.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-020847, filed Feb. 7, 2019, which is hereby incorporated by reference herein in its entirety.

What is claimed is:

1. A notification system including a printing apparatus and a server system that controls a voice control device and the printing apparatus, comprising:

the printing apparatus comprising a memory containing instructions and at least one processor to execute the instructions to function as a first transmission unit configured to transmit, to the server system, state information concerning a state of the printing apparatus, the server system comprising a memory containing instructions and at least one processor to execute the instructions to function as:

an acquisition unit configured to acquire the state information from the printing apparatus based on a user inputting a predetermined voice to the voice control device;
a specifying unit configured to specify trouble occurring in the printing apparatus based on the state information acquired from the printing apparatus;
a second transmission unit configured to transmit, to the voice control device, information for notifying the user of information concerning the specified trouble by voice; and
an instruction unit configured to instruct the printing apparatus to execute processing for solving the specified trouble,
wherein the information for notifying the user of the information concerning the specified trouble by voice is information for confirming, with the user, by voice, whether the specified trouble has occurred in the printing apparatus,
if a response of the user to the information for confirming, with the user, by voice, whether the specified trouble has occurred in the printing apparatus indicates that the specified trouble has occurred in the printing apparatus, the printing apparatus is instructed to execute the processing for solving the specified trouble, and
if the response of the user to the information for confirming, with the user, by voice, whether the specified trouble has occurred in the printing apparatus indicates that the specified trouble has not occurred in the printing apparatus, the printing apparatus is not instructed to execute the processing for solving the specified trouble, and information for confirming, with the user, by voice, whether a trouble different from the specified trouble has occurred in the printing apparatus is transmitted.

2. The notification system according to claim 1, wherein the state information acquired from the printing apparatus is first state information,
the at least one processor of the server system further executes instructions to function as a state information acquisition unit configured to acquire, from the voice control device, second state information concerning a state of the printing apparatus input by voice, if the user inputs the second state information by voice to the voice control device,
wherein the trouble occurring in the printing apparatus is specified based on the second state information acquired from the voice control device and the first state information acquired from the printing apparatus.

3. The notification system according to claim 2, wherein the second state information acquired from the voice control device is a state concerning a state of a printed material output from the printing apparatus.

4. The notification system according to claim 1, wherein the state information acquired from the printing apparatus is at least one of information concerning a printing material held by the printing apparatus and information concerning a printing unit provided in the printing apparatus.

5. The notification system according to claim 1, wherein
if the specified trouble is a first trouble, execution of the processing for solving the specified trouble is instructed, and
if the specified trouble is a second trouble, execution of the processing for solving the specified trouble is not instructed.

6. The notification system according to claim 5, wherein the first trouble is a trouble concerning a printing unit provided in the printing apparatus, and
the processing for solving the first trouble is processing of cleaning the printing unit.

7. The notification system according to claim 5, wherein
if the specified trouble is the first trouble, information for confirming with the user whether to instruct the printing apparatus to execute the processing for solving the first trouble is transmitted to the voice control device, and
if a response indicating that the printing apparatus is instructed to execute the processing for solving the first trouble is received from the voice control device, the printing apparatus is instructed to execute the processing for solving the first trouble.

8. The notification system according to claim 5, wherein the second trouble is a trouble concerning a printing material held by the printing apparatus.

9. The notification system according to claim 5, wherein if the specified trouble is the second trouble, information for prompting the user to execute the processing for solving the second trouble is transmitted to the voice control device.

10. The notification system according to claim 1, wherein the at least one processor of the server system further executes instructions to function as:
a history information acquisition unit configured to acquire history information concerning an execution history of the processing for solving the specified trouble; and
a processing specifying unit configured to specify, based on the history information, one of a plurality of processes for solving the specified trouble to be executed,
wherein the printing apparatus is instructed to execute the specified processing.

11. The notification system according to claim 1, wherein
if a plurality of troubles occurring in the printing apparatus are specified based on the state information, information for notifying, by voice, the user of information concerning a trouble with a first priority level among the plurality of troubles is transmitted to the voice control device, and
information for notifying, by voice, the user of information concerning a trouble with a second priority level lower than the first priority level among the plurality of troubles is not transmitted to the voice control device.

12. The notification system according to claim 1, the at least one processor of the server system is further configured to function as a third transmission unit configured to transmit, to a terminal apparatus, information for notifying, by a screen, the user of the information concerning the specified trouble.

13. The method notification system according to claim 1, wherein the server system includes at least one server.

14. A server system for controlling a voice control device and a printing apparatus, comprising:
a memory containing instructions and at least one processor for executing the instructions to function as:
an acquisition unit configured to acquire state information concerning a state of the printing apparatus from the printing apparatus based on a fact that a user inputs a predetermined voice to the voice control device;
a specifying unit configured to specify trouble occurring in the printing apparatus based on the state information acquired from the printing apparatus;

a transmission unit configured to transmit, to the voice control device, information for notifying the user of information concerning the specified trouble by voice; and an instruction unit configured to instruct the printing apparatus to execute processing for solving the specified trouble, wherein the information for notifying the user of the information concerning the specified trouble by voice is information for confirming, with the user, by voice, whether the specified trouble has occurred in the printing apparatus, if a response of the user to the information for confirming, with the user, by voice, whether the specified trouble has occurred in the printing apparatus indicates that the specified trouble has occurred in the printing apparatus, the printing apparatus is instructed to execute the processing for solving the specified trouble, and if the response of the user to the information for confirming, with the user, by voice, whether the specified trouble has occurred in the printing apparatus indicates that the specified trouble has not occurred in the printing apparatus, the printing apparatus is not instructed to execute the processing for solving the specified trouble, and information for confirming, with the user, by voice, whether a trouble different from the specified trouble has occurred in the printing apparatus is transmitted.

15. The system according to claim 14, wherein the state information acquired from the printing apparatus is first state information, the at least one processor further executes instructions to function as an information acquisition unit configured to acquire, from the voice control device, the second state information concerning a state of the printing apparatus input by voice, if the user inputs the second state information by voice to the voice control device, wherein the trouble occurring in the printing apparatus is specified based on the second state information acquired from the voice control device and the first state information acquired from the printing apparatus.

16. The system according to claim 14, wherein if the specified trouble is a first trouble, execution of the processing for solving the specified trouble is instructed, and if the specified trouble is a second trouble, execution of the processing for solving the specified trouble is not instructed.

17. The system according to claim 14, wherein the at least one processor further executes instructions to function as a second transmission unit configured to transmit, to a terminal apparatus, information for notifying, by a screen, the user of the information concerning the specified trouble.

18. The system according to claim 14, wherein the server system includes at least one server.

19. A notification system including a voice control device and a server system that controls the voice control device and a printing apparatus, comprising:

the server system comprising a memory containing instructions and at least one processor executing the instructions to function as:

an acquisition unit configured to acquire state information concerning a state of the printing apparatus from the printing apparatus based on a user inputting a predetermined voice to the voice control device;

a specifying unit configured to specify trouble occurring in the printing apparatus based on the state information acquired from the printing apparatus;

a transmission unit configured to transmit, to the voice control device, information for notifying the user of information concerning the specified trouble by voice; and an instruction unit configured to instruct the printing apparatus to execute processing for solving the specified trouble, the voice control device comprising a memory containing instructions and at least one processor executing the instructions to function as a notification unit configured to, if information for notifying the user of the information concerning the specified trouble by voice is received, notify the user of the information concerning the specified trouble by voice, wherein the information for notifying the user of the information concerning the specified trouble by voice is information for confirming, with the user, by voice, whether the specified trouble has occurred in the printing apparatus, if a response of the user to the information for confirming, with the user, by voice, whether the specified trouble has occurred in the printing apparatus indicates that the specified trouble has occurred in the printing apparatus, the printing apparatus is instructed to execute the processing for solving the specified trouble, and if the response of the user to the information for confirming, with the user, by voice, whether the specified trouble has occurred in the printing apparatus indicates that the specified trouble has not occurred in the printing apparatus, the printing apparatus is not instructed to execute the processing for solving the specified trouble, and information for confirming, with the user, by voice, whether a trouble different from the specified trouble has occurred in the printing apparatus is transmitted.

* * * * *